US012784402B2

(12) United States Patent
Coyle et al.

(10) Patent No.: US 12,784,402 B2
(45) Date of Patent: Nov. 3, 2026

(54) SYSTEMS AND METHODS FOR SEGMENTING AND CORRECTING TIME-SERIES DATA FOR MACHINE LEARNING MODEL TRAINING

(71) Applicant: Verizon Patent and Licensing Inc., Basking Ridge, NJ (US)

(72) Inventors: Timothy E. Coyle, Chicopee, MA (US); Ammara Essa, Los Angeles, CA (US); Hector Alejandro Garcia Crespo, N Richland Hills, TX (US); Matthew Kapala, North Billerica, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 159 days.

(21) Appl. No.: 18/931,308

(22) Filed: Oct. 30, 2024

(65) Prior Publication Data

US 2026/0120427 A1 Apr. 30, 2026

(51) Int. Cl.

| | |
|---|---|
| ***G06K 9/62*** | (2022.01) |
| ***G06V 10/72*** | (2022.01) |
| ***G06V 10/762*** | (2022.01) |
| ***G06V 10/77*** | (2022.01) |
| ***G06V 10/774*** | (2022.01) |
| ***G06V 10/776*** | (2022.01) |
| *G06V 10/82* | (2022.01) |

(52) U.S. Cl.

CPC .......... *G06V 10/72* (2022.01); *G06V 10/7625* (2022.01); *G06V 10/7715* (2022.01); *G06V 10/774* (2022.01); *G06V 10/776* (2022.01); *G06V 10/82* (2022.01)

(58) Field of Classification Search

CPC ............... G06V 10/72; G06V 10/7625; G06V 10/7715; G06V 10/774; G06V 10/776; G06V 10/82; G06V 10/62; G06F 18/214; G06F 2123/02; H04L 41/16

See application file for complete search history.

(56) References Cited

FOREIGN PATENT DOCUMENTS

| | | | | |
|---|---|---|---|---|
| CN | 105654130 A | * | 6/2016 | ............. G06N 3/088 |
| CN | 111563424 B | * | 8/2022 | ........... G06F 18/214 |
| CN | 115063867 A | * | 9/2022 | ........... G06V 40/168 |
| CN | 116756495 A | * | 9/2023 | ............. G06F 18/15 |

* cited by examiner

*Primary Examiner* — Xin Jia

(57) ABSTRACT

A device may receive time-series data, may divide the time-series data into sets, and may identify data gaps in each of the sets of time-series data. The device may normalize the data gaps to generate normalized data gaps, may generate images of the normalized data gaps, and may extract features from the images of the normalized data gaps. The device may compute spatial distances based on the features, may transform the spatial distances to vector form spatial distances, and may perform hierarchical and agglomerative clustering on the vector form spatial distances to generate clusters. The device may select a set of the clusters, may perform a data fill method on the set of the clusters to generate a final set of the clusters, and may train the machine learning model, with the final set of the clusters, to generate a trained machine learning model.

20 Claims, 15 Drawing Sheets

SYSTEMS AND METHODS FOR SEGMENTING AND CORRECTING TIME-SERIES DATA FOR MACHINE LEARNING MODEL TRAINING

BACKGROUND

Time-series data is a collection of data points recorded at regular intervals over time, such as network packet gateway data. The order of the data points is important because it can help identify patterns, trends, and seasonal variations. In the realm of machine learning and data analysis, time-series data may be utilized for training machine learning models.

DETAILED DESCRIPTION OF EXAMPLE EMBODIMENTS

Figure 1A:
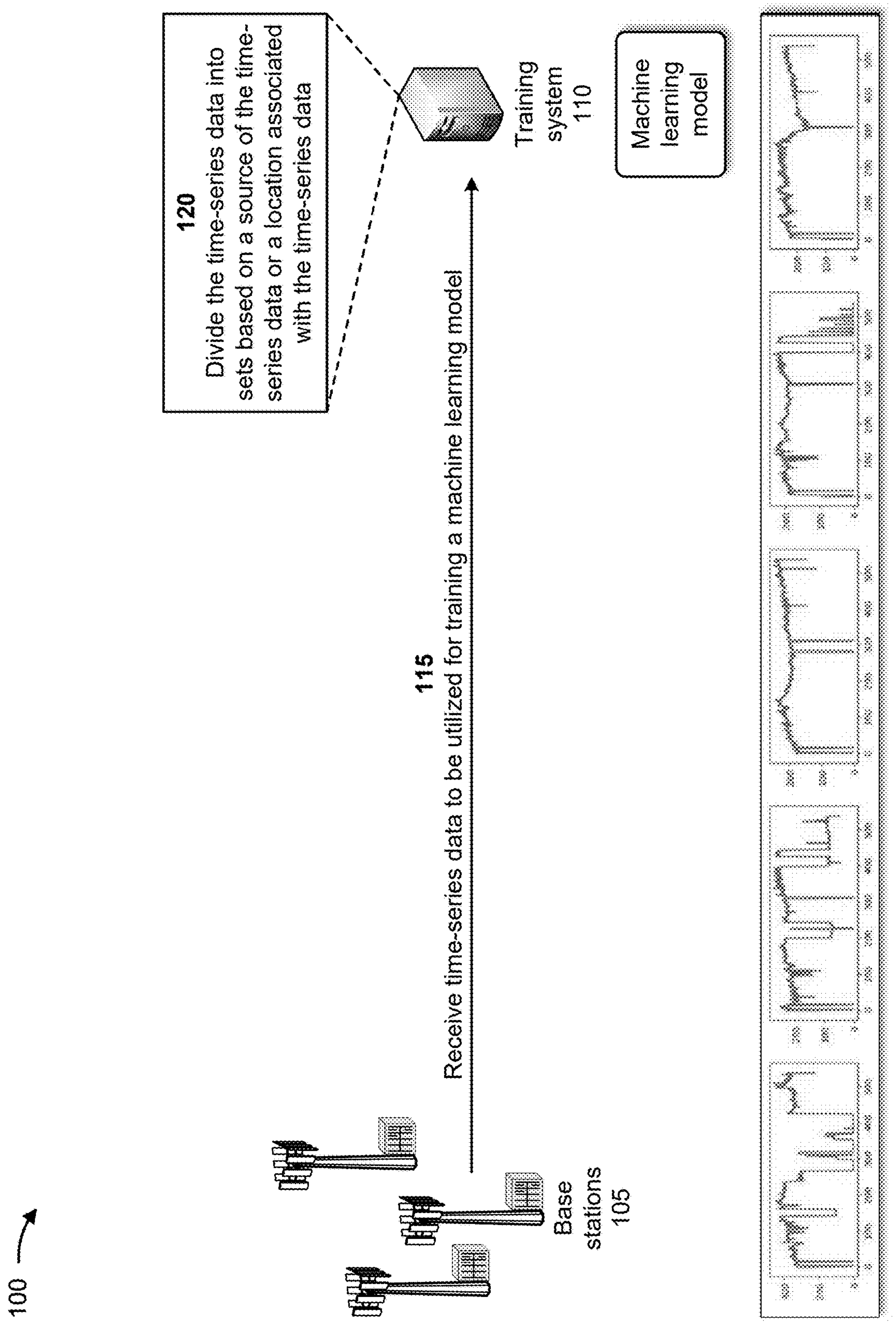
FIGS. 1A-1L are diagrams of an example associated with correcting time-series data to be utilized as training data for a machine learning model.

The following detailed description of example implementations refers to the accompanying drawings. The same reference numbers in different drawings may identify the same or similar elements.

Gaps in time-series data associated with network packet gateways can pose several significant challenges, particularly when it comes to data analysis, monitoring, and machine learning model training. Time-series data requires continuous monitoring and recording of events or metrics at regular intervals. Gaps in this data mean that some data points are missing, thereby leading to incomplete datasets. Missing data can result in the loss of crucial information, which can be detrimental when trying to draw insights or make predictions. Important events or trends may be missed, affecting the overall accuracy and reliability of analyses. Time-series data is often used to identify trends, patterns, and anomalies over time. Gaps in the data can disrupt these trends and make it difficult to identify and understand underlying patterns. Inconsistent or missing data can introduce bias, as some periods or events are underrepresented, which can skew the results and lead to incorrect conclusions.

Training machine learning models requires accurate and complete datasets. Gaps in time-series data from network packet gateways can compromise model training, resulting in lower accuracy and poor predictive performance. This is particularly critical for tasks such as forecasting, anomaly detection, and network optimization. Network packet gateways rely on continuous data to detect anomalies, such as unusual traffic patterns that might indicate a cyberattack. Gaps in data can reduce the effectiveness of these detection systems, potentially allowing malicious activities to go unnoticed. Regular monitoring of network performance metrics (e.g., throughput, latency, and packet loss) is essential for maintaining optimal network operation. Gaps in time-series data can hinder the ability to monitor performance accurately, affecting network reliability and user experience.

Gaps in the time-series data can propagate errors in downstream processes. For example, an inaccurate prediction made by a machine learning model due to incomplete training data can lead to suboptimal decisions and operational inefficiencies.

Time-series data may be used to predict future values through a process called forecasting. This is done by using statistical techniques to model and generate predictions based on past patterns shown in the time-series data. However, time-series data can exhibit significant data gaps, variances in distribution, and/or substantial chunks of missing data. The data gaps in the time-series data present a substantial challenge, as varying amounts of missing data can impact machine learning model accuracy and performance to different degrees. Thus, current techniques for training a machine learning model with time-series data consume computing resources (e.g., processing resources, memory resources, communication resources, and/or the like), networking resources, and/or other resources associated with failing to address data incompleteness in time-series data, generating an improperly trained machine learning model based on incomplete time-series data, generating erroneous predictions with the improperly trained machine learning model, handling customer complaints associated with the erroneous predictions of the machine learning model, retraining the improperly trained machine learning models, and/or the like.

Some implementations described herein provide a device (e.g., a training system) that corrects time-series data to be utilized as training data for a machine learning model. For example, the training system may receive time-series data to be utilized for training a machine learning model, and may divide the time-series data into sets based on sources of the time-series data or locations associated with the time-series data. The training system may identify data gaps in each of the sets of time-series data, and may normalize the data gaps to generate normalized data gaps. The training system may generate images of the normalized data gaps, and may perform feature extraction on the images of the normalized data gaps to generate features. The training system may compute spatial distances based on the features, and may transform the spatial distances to vector form spatial distances. The training system may perform hierarchical and agglomerative clustering on the vector form spatial distances to generate clusters, and may select a set of clusters based on a business model or an algorithmic technique. The training system may perform a data fill method on the set of the clusters to provide synthetic data for missing data and to generate a final set of the clusters, and may train the machine learning model, with the final set of the clusters, to generate a trained machine learning model.

In this way, the training system corrects time-series data to be utilized as training data for a machine learning model. For example, the training system may receive time-series data and categorize it into distinct segments based on sources or locations of the data. The training system may detect discontinuities within each segment of time-series data, may sanitize the discontinuities to generate representations of normalized data gaps, and may execute feature extraction on these representations to identify distinguishing features. Subsequently, the training system may calculate spatial relationships derived from the identified features, may convert these relationships into vector-based representations, and may apply hierarchical and agglomerative clustering to the vector-based spatial relationships to form distinct clusters. The training system may select a subset of these clusters, may employ a data augmentation method to synthesize data for missing elements, and may utilize the enhanced dataset to train a machine learning model. Thus, the training system may conserve computing resources, networking resources, and/or other resources that would have otherwise been consumed by failing to address data incompleteness in time-series data, generating an improperly trained machine learning model based on incomplete time-series data, generating erroneous predictions with the improperly trained machine learning model, handling customer complaints associated with the erroneous predictions of the machine learning model, retraining the improperly trained machine learning models, and/or the like.

FIGS. 1A-1L are diagrams of an example 100 associated with correcting time-series data to be utilized as training data for a machine learning model. As shown in FIGS. 1A-1L, the example 100 includes base stations 105 associated with a training system 110. Further details of the base stations 105 and the training system 110 are provided elsewhere herein. In some implementations, the training system 110 may be associated with a machine learning model to be utilized to manage the base stations 110. In some implementations, the training system 110 may be utilized to train any machine learning model associated with functions other than managing the base stations 105. In some implementations, one or more of the functions described herein as being performed by the training system 110 may be performed by the base stations 105.

As shown in FIG. 1A, and by reference number 115, the training system 110 may receive time-series data to be utilized for training a machine learning model. For example, each of the base stations 105 may generate data (e.g., physical resource block (PRB) data) in a time domain. Each base station 105 may continuously monitor various operational parameters, such as signal strength (e.g., power of received signals from user equipment (UE)), throughput (e.g., a quantity of data successfully transmitted and received over time), uplink and downlink speeds (e.g., data transfer rates for both sending and receiving), connection quality (e.g., signal-to-noise ratio (SNR), bit error rate (BER), and latency), user sensitivity (e.g., quantity of active connections or devices), resource utilization (e.g., usage of frequency bands, time slots, and PRBs), and/or the like. To generate time-series data, the base station 105 may sample these parameters at regular intervals (e.g., ranging from milliseconds to minutes or even longer). FIG. 1A includes example graphs depicting time-series data received from the base stations 105, where the horizontal axis (x-axis) corresponds to time (e.g., days) and the vertical axis (y-axis) corresponds to throughput.

The management system 110 may periodically receive the time-series data from the base stations 105, may continuously receive the time-series data from the base stations 105, may receive the time-series data based on providing a request for the time-series data to the base stations 105, and/or the like. In some implementations, the management system 110 may utilize the time-series data to train machine learning models for tasks, such as traffic prediction, anomaly detection, and optimization of network parameters.

As further shown in FIG. 1A, and by reference number 120, the training system 110 may divide the time-series data into sets based on sources of the time-series data or locations associated with the time-series data. For example, the training system 110 may aggregate the time-series data based on the sources of the time-series data (e.g., the base stations 105) or the locations associated with the time-series data (e.g., geographical locations of the base stations 105). In some implementations, the training system 110 may aggregate the time-series data using a data aggregation model. For example, the training system 110 may utilize the data aggregation model to group the time-series data into clusters based on the sources or locations or to combine the time-series data from multiple sources or locations into a single dataset. The training system 110 may divide the aggregated time-series data into the sets based on the sources of the time-series data or locations associated with the time-series data. In some implementations, the training system 110 may divide the time-series data into the sets using a data division technique.

Figure 1B:
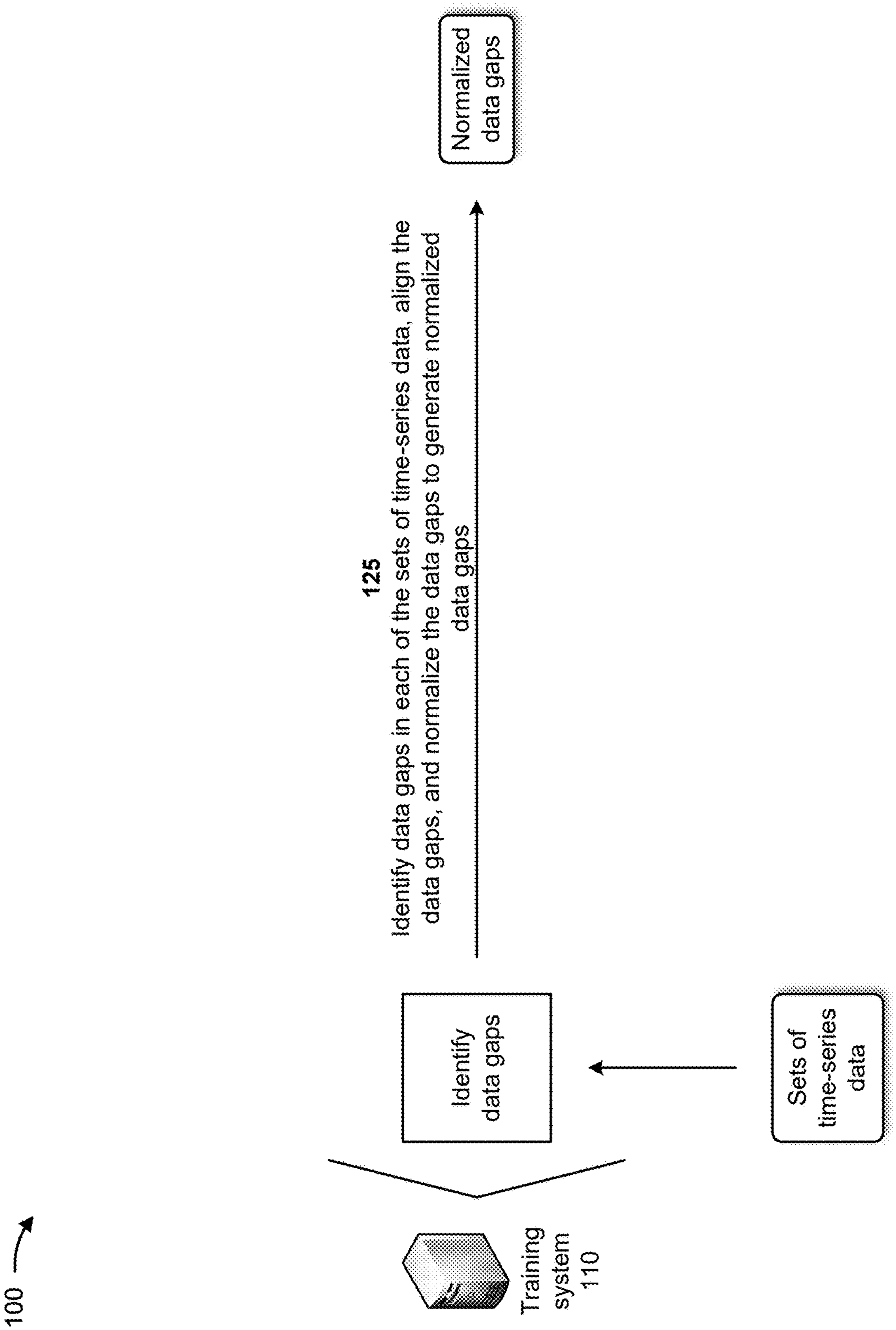

As shown in FIG. 1B, and by reference number 125, the training system 110 may identify data gaps in each of the sets of time-series data, may align the data gaps, and may normalize the data gaps to generate normalized data gaps. For example, the training system 110 may analyze the sets of time-series data to detect gaps where data points are missing. The detected gaps where data points are missing may be referred to as data gaps in each of the sets of the time-series data. In some implementations, the training system 110 may isolate the data gaps from the time-series data prior to normalizing the data gaps. This may enable the training system 110 to process the problematic areas in the data (e.g., the data gaps) and to provide focused normalization procedures, thereby making the normalization process more effective.

The training system 110 may then align the data gaps to a common timeline to ensure that the data gaps are aligned across the different sets of time-series data. The alignment of the data gaps may normalize the data gaps to generate the normalized data gaps. The normalization of the data gaps may include adjusting values measured on different scales to a common scale so that the data gaps are presented in a consistent manner, allowing for easier comparison and analysis. The resulting normalized data gaps may provide a uniform view of where and how much data is missing across the different sets. In some implementations, normalizing the data gaps may include time aligning the data gaps, which may ensure that all sets of the time-series data align temporally, which is fundamental when combining data from different sources that may not be synchronized. Additionally, or alternatively, the training system 110 may normalize the data gaps by applying a minimum/maximum scalar to the data gaps. This technique may adjust a scale of the data gaps, and may standardize the data gaps across different data sets.

Figure 1C:
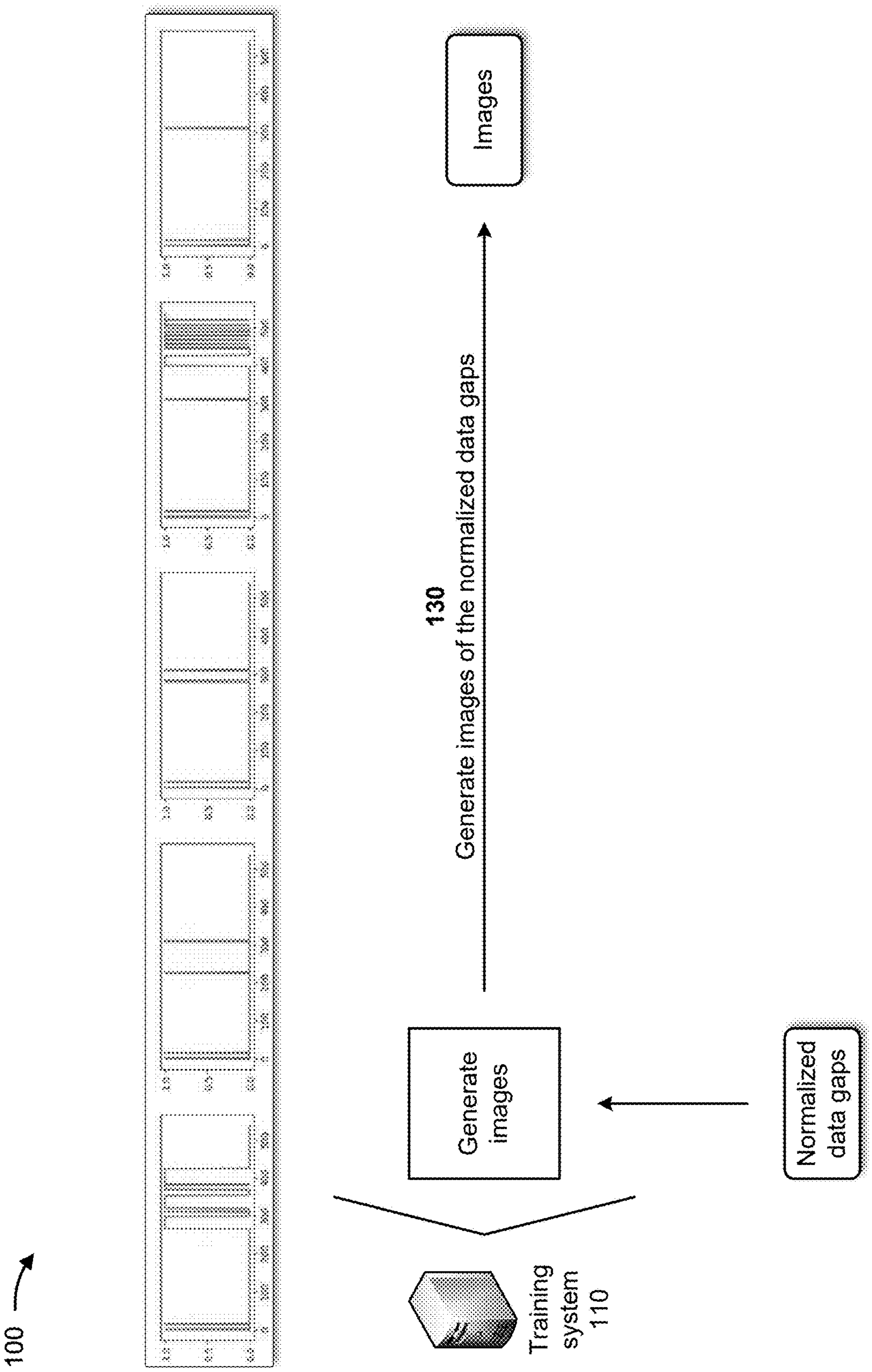

As shown in FIG. 1C, and by reference number 130, the training system 110 may generate images of the normalized data gaps. For example, the training system 110 may transform the normalized data gaps into image representations by plotting the normalized data gaps over a timeline or another informative axis to create visual representations, which are subsequently stored as images. The transformation of the normalized data gaps to images may enable the training system 110 to apply various image processing techniques for further analysis. In some implementations, generating images of the normalized data gaps may include the training system 110 converting the normalized values of the data gaps to a binary form where a 1 (one) indicates missing data and a 0 (zero) indicates available data.

In some implementations, generating the images of the normalized data gaps may include the training system 110 transforming the normalized data gaps into a series of heatmaps, allowing for a gradient-based visual representation of data presence and absence. The use of heatmaps may aid in visualizing the intensity and distribution of data gaps and may aid in recognizing patterns and data densities. Additionally, or alternatively, generating the images of the normalized data gaps may include training system 110 assigning different grayscale values to represent varying levels of data completeness or confidence intervals around the data gaps. Additionally, or alternatively, generating the images of the normalized data gaps may include the training system 110 utilizing geometric shapes or symbols to annotate different categories or sources of the data gaps, providing a multifaceted visual analysis. For example, the training system 110 may encode additional metadata within the images, such as an origin of the data gaps, which may aid in the contextual understanding of the data gaps.

Additionally, or alternatively, generating the images of the normalized data gaps may include the training system 110 creating three-dimensional (3D) models or layered visualizations of the normalized data gaps. The 3D models and the layered visualizations may indicate how multiple data sets or dimensions interrelate, offering a comprehensive insight into complex data patterns. Additionally, or alternatively, the training system 110 may utilize video analysis techniques by converting the normalized data gaps into time-lapse animations, capturing evolving patterns over time. The time-lapse animations may provide an understanding of how the data gaps change across different temporal intervals.

Additionally, or alternatively, generating the images of the normalized data gaps may include the training system 110 utilizing colormap transformation to generate color-coded images of the normalized data gaps, where each color represents a distinct class or severity level of the data gaps. Additionally, or alternatively, generating the images of the normalized data gaps may include the training system 110 utilizing edge detection models that highlight contours of the data gaps, facilitating precise identification of critical gaps. Additionally, or alternatively, generating the images of the normalized data gaps may include the training system 110 utilizing texture mapping techniques to generate the images, allowing different textures to represent various characteristics of the data gaps, such as frequency and duration. In some implementations, rather than transforming the normalized data gaps to images, the training system 110 may utilize a real-time flow visualization technique that continuously renders image updates as new data gaps are identified and normalized. In some implementations, the training system 110 may utilize symbolic artificial intelligence (AI) methods to interpret and analyze the images of the normalized data gaps, drawing on pre-defined rules and logic to find patterns. This may include utilizing domain-specific knowledge to highlight significant insights that may not be evident from standard visual analysis methods.

Figure 1D:
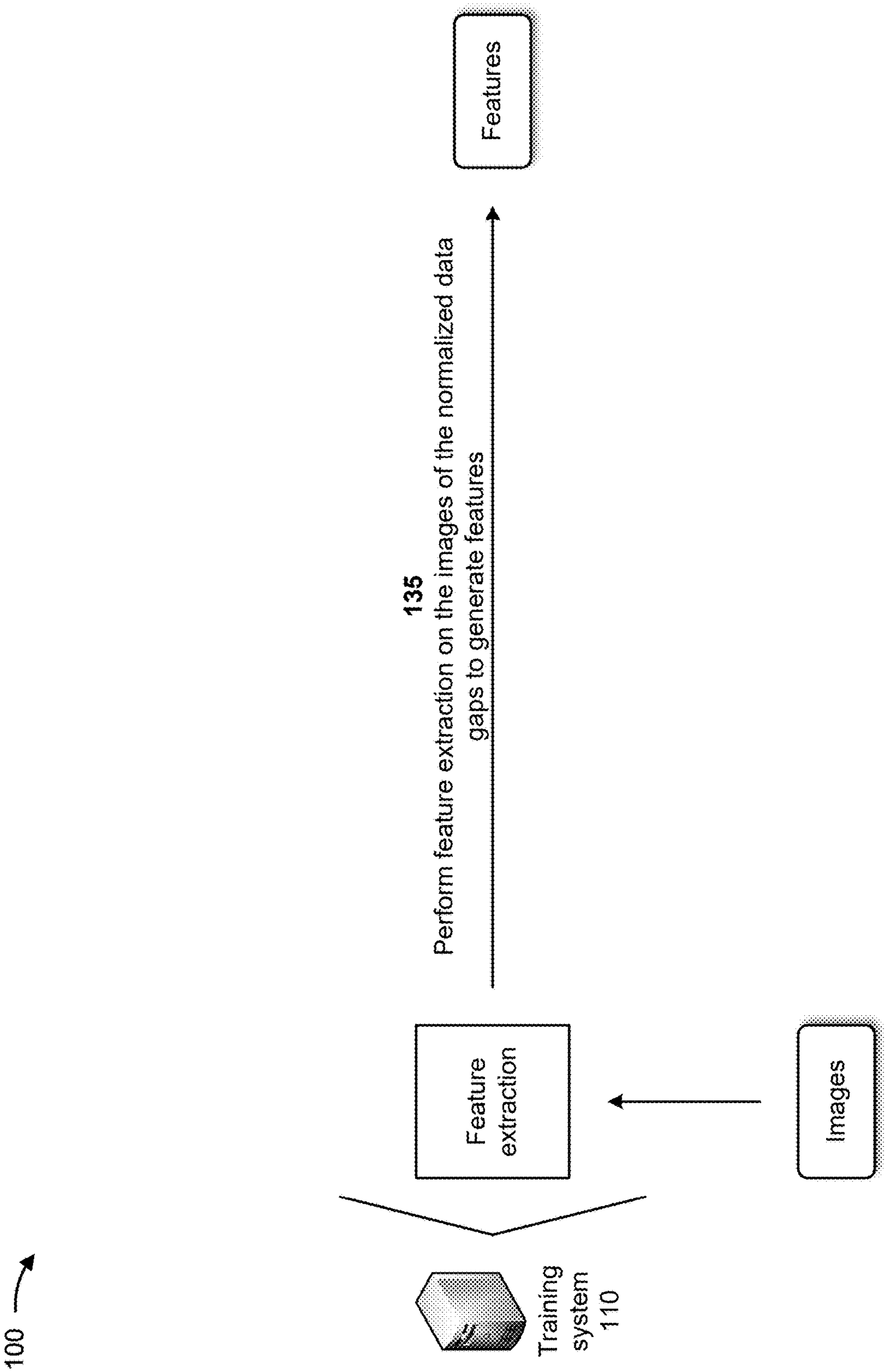

As shown in FIG. 1D, and by reference number 135, the training system 110 may perform feature extraction on the images of the normalized data gaps to generate features. For example, the training system 110 may analyze the images of the normalized data gaps to identify and extract features, such as pertinent attributes or characteristics. The feature extraction process may include applying various techniques, such as edge detection models, histogram of oriented gradients (HOG), a scale-invariant feature transform (SIFT), neural network models, or other image processing techniques to derive meaningful features from the images of the normalized data gaps. For example, by utilizing an edge detection model, the training system 110 may identify significant transitions in pixel intensity that represent boundaries of data gaps. Additionally, or alternatively, the feature extraction may include detecting contours, gradients, or other visual components that signify data gaps. In some implementations, the feature extraction may include the training system 110 recognizing key structures or distinctive markings. Key structures may include consistent patterns repeating across different images, or specific anomalies that differentiate one segment of data from another.

Additionally, the feature extraction may utilize specific characteristics of the normalized data gaps. For example, the training system 110 may utilize gradient-based techniques to identify orientations and magnitudes of changes within the images, or may utilize texture analysis to discern patterns indicative of data gap distributions. Additionally, or alternatively, the feature extraction may include employing texture analysis or a color histogram to elucidate patterns inherent in the data gaps. Additionally, or alternatively, the feature extraction may utilize convolutional neural networks or other advanced pattern recognition models trained to recognize specific patterns and anomalies within the images. For example, convolutional neural networks may detect complex features, such as edges, textures, and shapes, and may focus on distinctive attributes of the data gaps in the time-series data.

In some implementations, the training system 110 may store the extracted features as vectors or matrices, capturing spatial relationships, intensity values, edge orientations, or other significant attributes. The features may serve as a foundational data representation for further processing steps, such as computing spatial distances or performing clustering operations. Additionally, or alternatively, the training system 110 may encode the features as numerical vectors, capturing spatial relationships, gradient orientations, or intensity variations. Additionally, or alternatively, the training system 110 may store the features as matrices that encompass edge orientations, texture patterns, or other spatial attributes. For example, a feature matrix may encode pixel intensity values across a set grid, preserving spatial arrangement information that may be utilized for recognizing patterns. Additionally, or alternatively, the training system 110 may store the extracted features as sets of vectors or matrices that may be provided to clustering models or distance models to systematically analyze data gap patterns.

Figure 1E:
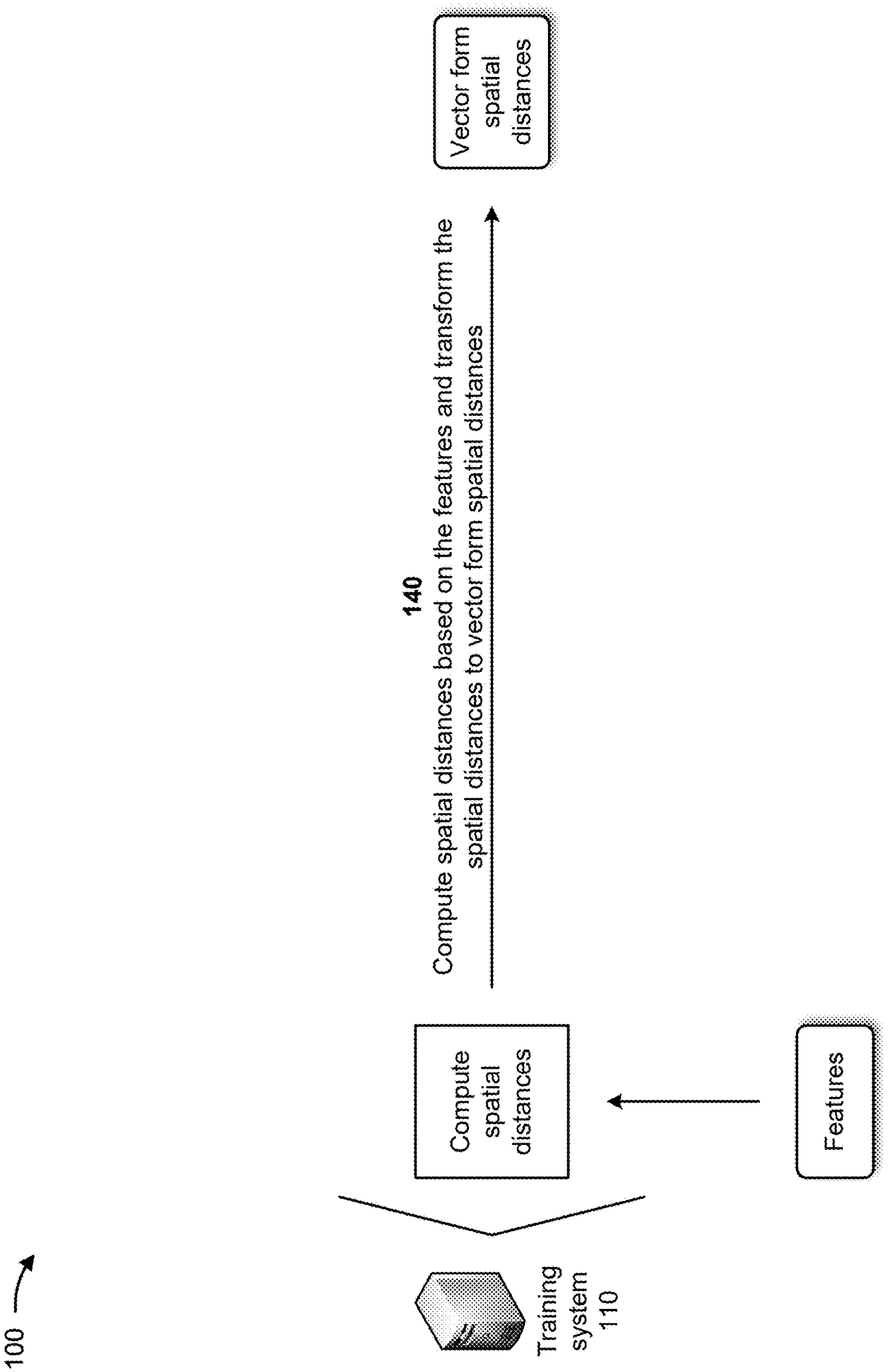

As shown in FIG. 1E, and by reference number 140, the training system 110 may compute spatial distances based on the features and may transform the spatial distances to vector form spatial distances. For example, the training system 110 may analyze the images of the normalized data gaps to determine spatial relationships among the features. The training system 110 may compute the spatial distances by measuring dissimilarities or similarities between pairs of features, using techniques such as Euclidean distance or cosine similarity. In some implementations, the training system 110 may compute spatial distances based on the features by utilizing a Manhattan distance. The Manhattan distance measures an absolute sum of differences between points across all dimensions, which can be particularly useful in grid-based data systems. Additionally, or alternatively, the training system 110 may compute spatial distances based on the features by utilizing a Hamming distance. The Hamming distance counts a quantity of differing bits between binary vectors, making it suitable for datasets with binary feature representations. Additionally, or alternatively, the training system 110 may utilize a combination of different distance metrics to calculate the spatial distances.

The training system 110 may then transform the spatial distances into a vector form that encapsulates the spatial information into a structured format suitable for further processing and clustering. In some implementations, transforming the spatial distances into vector form may include the training system 110 utilizing dimensionality reduction techniques, such as a principal component analysis (PCA).

A PCA may reduce the dimensionality of data while preserving most of a variance of the data. Additionally, or alternatively, transforming the spatial distances may include the training system 110 utilizing t-distributed stochastic neighbor embedding (t-SNE). A t-SNE may be effective for high-dimensional data, enabling visualization of complex datasets in lower dimensions. Additionally, or alternatively, the training system 110 may utilize neural network encoding methods, such as autoencoders, to transform the spatial distances. Autoencoders may compress the spatial distances into a more compact form, ensuring efficient storage and processing.

Additionally, or alternatively, the spatial distances may be represented using a matrix form or a tensor form. A matrix form may provide a straightforward two-dimensional representation of distances between feature pairs, while a tensor form may encapsulate multi-dimensional relationships across features. Additionally, or alternatively, the spatial distances transformation may include the training system 110 mapping the spatial distances to a multidimensional space where each dimension corresponds to a feature set characteristic. In some implementations, the transformation may include the training system 110 assigning numerical vector representations to each computed spatial distance, facilitating hierarchical and agglomerative clustering in subsequent steps.

Figure 1F:
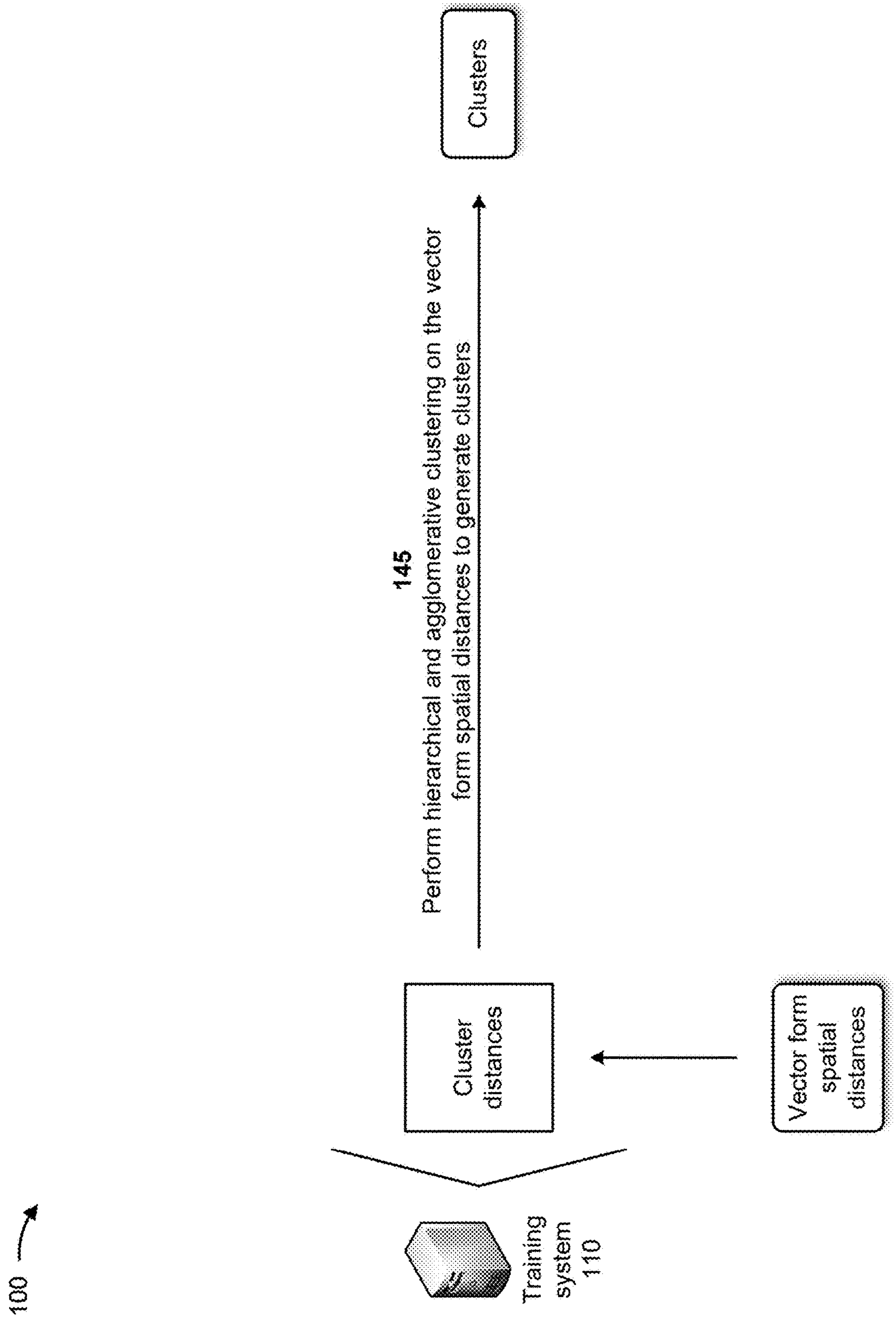

As shown in FIG. 1F, and by reference number 145, the training system 110 may perform hierarchical and agglomerative clustering on the vector form spatial distances to generate clusters. For example, the training system 110 may apply hierarchical and agglomerative clustering models to the vector form spatial distances to form distinct clusters. The clustering process may organize data points based on similarities, helping in systematically grouping closer series together. The hierarchical and agglomerative clustering may utilize linkage criteria to iteratively merge the clusters based on the spatial distances until all data points form a single cluster hierarchy. In some implementations, the hierarchical and agglomerative clustering may include k-means clustering, which clusters partitions of data into a set quantity of clusters by minimizing intra-cluster variance, effectively grouping data points into a k number of distinct clusters. Additionally, or alternatively, the hierarchical and agglomerative clustering may include density-based clustering techniques, such as density-based spatial clustering of applications with noise (DBSCAN), which can determine arbitrarily shaped clusters by identifying areas of high data point density and expanding clusters based on a density threshold. Additionally, or alternatively, the hierarchical and agglomerative clustering may include applying a Gaussian mixture model (GMM) to the vector form spatial distances to statistically infer cluster memberships. A GMM may represent data as a mixture of multiple Gaussian distributions, allowing for a probabilistic association of data points to clusters.

Additionally, or alternatively, the hierarchical and agglomerative clustering may include utilizing spectral clustering on a spatial distances matrix to identify distinct clusters. Spectral clustering may use eigenvalues of a similarity matrix to perform dimensionality reduction before clustering in fewer dimensions. Additionally, or alternatively, the hierarchical and agglomerative clustering may include utilizing a Mahalanobis distance for measuring similarities, which accounts for variance and covariance structures in data and is particularly useful when data dimensions vary significantly. Additionally, or alternatively, the hierarchical and agglomerative clustering may include the training system 110 transforming the spatial distances into graph representations and conducting graph-based clustering, where nodes may represent data points and edges may represent distances or similarities between the data points.

In some implementations, the hierarchical and agglomerative clustering may include utilizing a neural network-based autoencoder to embed the spatial distances into a lower-dimensional space suitable for clustering. Autoencoders can compress data while retaining essential features, making clustering more efficient and effective. Additionally, or alternatively, the hierarchical and agglomerative clustering may include generating overlapping clusters by using soft clustering techniques, where a data point can belong to multiple clusters with varying degrees of membership.

Additionally, or alternatively, the hierarchical and agglomerative clustering may include using dynamic hyperparameters for clustering based on cluster validation performance, such as silhouette scores or the Davies-Bouldin index, which measures cluster compactness and separation. Additionally, or alternatively, the hierarchical and agglomerative clustering may include pre-processing the vector form spatial distances using dimensionality reduction techniques such as PCA, which simplifies the clustering process by reducing a quantity of features while retaining significant variance within the data. Additionally, or alternatively, the hierarchical and agglomerative clustering may include utilizing an iterative process where initial clusters are progressively optimized based on similarity metrics.

Figure 1G:
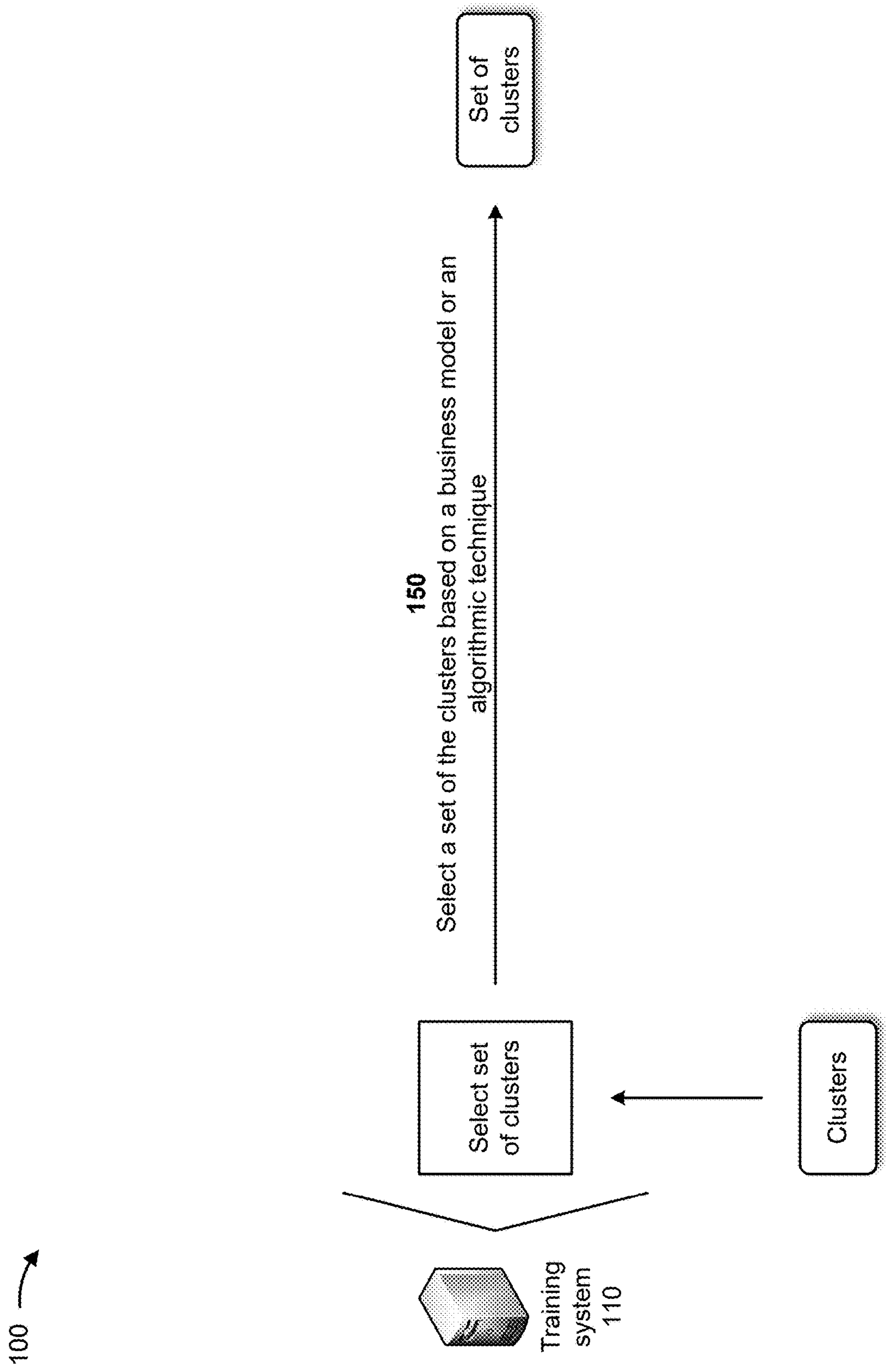

As shown in FIG. 1G, and by reference number 150, the training system 110 may select a set of the clusters based on a business model or an algorithmic technique. For example, the training system 110 may analyze the clusters generated during the hierarchical and agglomerative clustering and may determine which clusters best align with objectives defined by a business model or a particular algorithmic technique. In some implementations, the business model may dictate the importance of minimizing data gaps, while in other implementations, the algorithmic technique may prioritize retention of certain types of data patterns within clusters. The selection of the set of the clusters may include evaluating the clusters using predefined criteria and selecting the set of clusters that provides the best balance between the criteria.

In some implementations, selecting the set of the clusters may include the training system 110 utilizing a rule-based approach to select a set of clusters determined to have a least impact on prediction accuracy. For example, rule-based selection may be driven by predefined rules that assess a potential prediction accuracy impact of each cluster. Additionally, or alternatively, selecting the set of the clusters may include the training system 110 selecting clusters based on preset statistical parameters, such as variance minimization or standard deviation thresholds. For example, clusters that exhibit lower variance or standard deviation may be preferred, to ensure data consistency and reliability.

Additionally, or alternatively, selecting the set of the clusters may include the training system 110 incorporating heuristic-based evaluations to prioritize clusters that demonstrate historical stability in data. For example, heuristic evaluations may analyze historical data trends and prioritize clusters that show stable patterns. Additionally, or alternatively, selecting the set of the clusters may include the training system 110 prioritizing clusters that exhibit characteristics compatible with known performance models for certain machine learning models. For example, clusters may be evaluated against performance benchmarks to ensure compatibility and optimal performance with specific machine learning models.

In some implementations, selecting the set of the clusters may include the training system 110 utilizing cross-validation methods to assess the robustness of different clusters and choose clusters with the highest validation scores. Additionally, or alternatively, selecting the set of the clusters may include the training system 110 utilizing an iterative testing approach where clusters are selected based on performance in live datasets and real-world scenario simulations. Additionally, or alternatively, selecting the set of the clusters may include the training system 110 utilizing multi-objective optimization techniques to concurrently optimize selected clusters for several criteria such as accuracy, robustness, and resource utilization. Additionally, or alternatively, selecting the set of the clusters may include the training system 110 utilizing a weighted scoring system to assign different weights to various objectives (e.g., minimizing data gaps versus retaining data patterns) and to select clusters based on an overall weighted score.

Additionally, or alternatively, selecting the set of the clusters may include the training system 110 prioritizing clusters that exhibit repeating seasonal data patterns relevant for specific predictive models. Additionally, or alternatively, selecting the set of the clusters may include the training system 110 selecting clusters to maximize retention of temporal coherence in missing data patterns, ensuring that periods of missing data are clustered together.

Figure 1H:
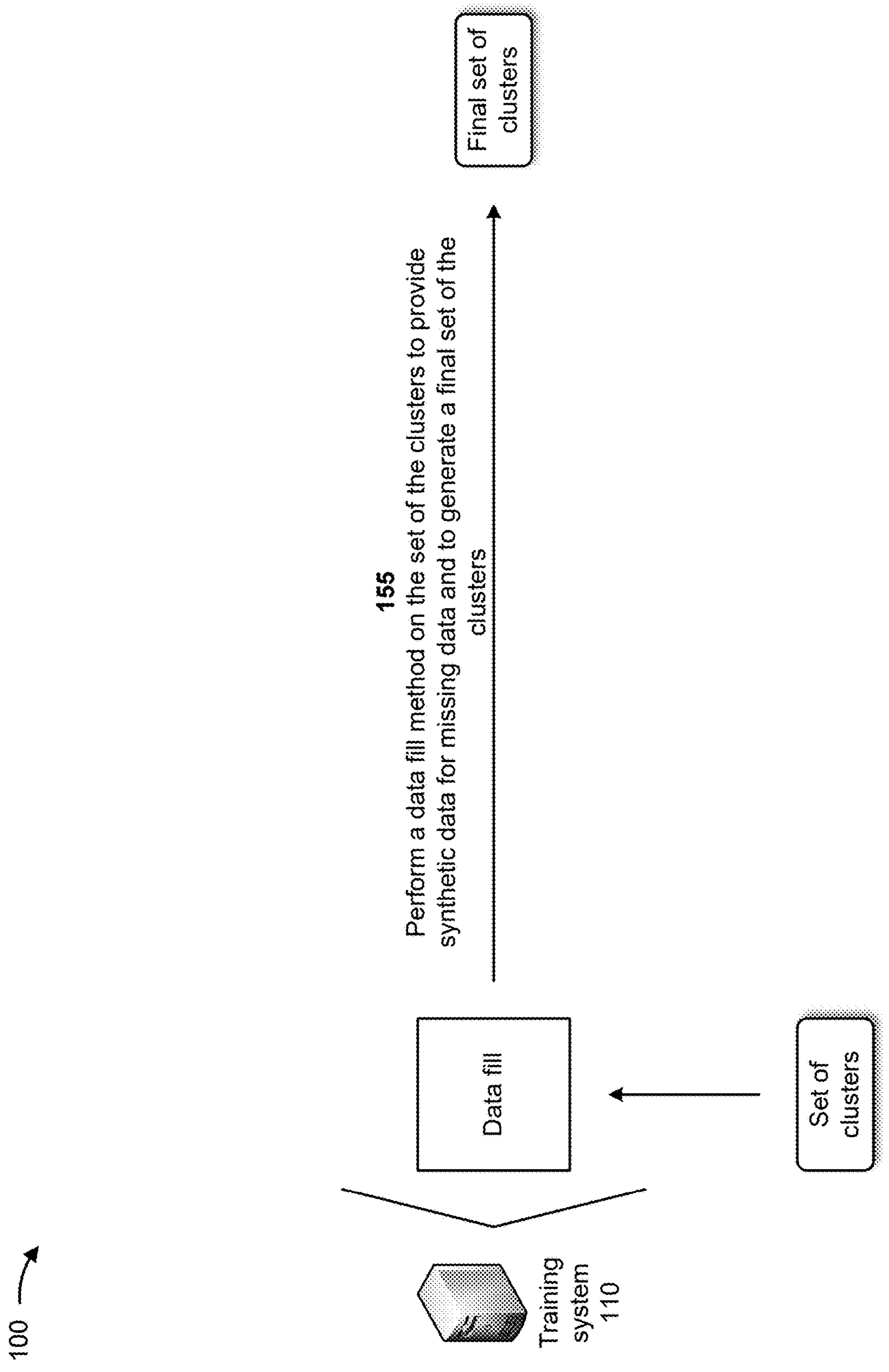

As shown in FIG. 1H, and by reference number 155, the training system 110 may perform a data fill method on the set of the clusters to provide synthetic data for missing data and to generate a final set of the clusters. For example, the training system 110 may analyze the set of the clusters to identify regions with missing data and may utilize models to synthesize the missing data, effectively filling the data gaps. The training system 110 may utilize interpolation techniques, statistical models, or machine learning models to generate the synthetic data. Additionally, the training system 110 may assess a quality of the synthetic data to ensure that the synthetic data aligns with patterns and characteristics of the original dataset. In some implementations, the training system 110 may utilize linear interpolation to estimate missing values between known data points, thereby maintaining continuity of the data. For example, polynomial interpolation may be used to fill more complex data gaps, providing higher accuracy over non-linear data ranges. Additionally, or alternatively, the training system 110 may utilize models to interpolate missing data within the clusters, and may ensure that the synthetic data is representative of the actual data. Additionally, or alternatively, for data imputation, the training system 110 may utilize machine learning models that predict and fill in missing data points within the clusters. The machine learning models may include regression models, neural network models, and/or the like trained on existing data to predict and replace missing values.

Additionally, or alternatively, the training system 110 may utilize statistical methods to estimate and replace the missing data in the clusters. The statistical methods may include a Bayesian estimation that infers missing data points based on probability distributions of known values. Additionally, or alternatively, the training system 110 may utilize advanced data generation techniques, such as generative adversarial networks (GANs), to create synthetic data that fills the data gaps within the clusters. In some implementations, the training system 110 may utilize both supervised and unsupervised learning methods to synthesize and integrate the missing data effectively. Supervised learning methods may include training a model on labeled data to predict missing values, while unsupervised methods may include clustering models that group similar data points together to infer missing values. Additionally, or alternatively, the training system 110 may utilize time-series-specific interpolation techniques to generate synthetic data that closely follows natural patterns observed in the original dataset. Additionally, or alternatively, the training system 110 may apply different synthetic data generation strategies for different data gaps, such as linear or polynomial interpolation for small gaps and more complex machine-learning-based imputation for larger gaps.

Additionally, or alternatively, the training system 110 may assess a quality of the synthetic data by utilizing cross-validation methods to ensure that the synthetic data maintains the statistical properties and relevance of the original data set. Additionally, or alternatively, the training system 110 may utilize hierarchical or agglomerative clustering again after synthesizing the data to confirm the integrity and consistency of the final clusters. Additionally, or alternatively, upon synthesizing the missing data, the training system 110 may perform a detailed analysis of the revised clusters to ensure that the synthetic data preserves temporal coherence and continuity with the original data. Additionally, or alternatively, the training system 110 may validate the synthetic data by comparing the synthetic data to known characteristics of the original data, ensuring that the generated data does not introduce biases or distortions.

Figure 1I:
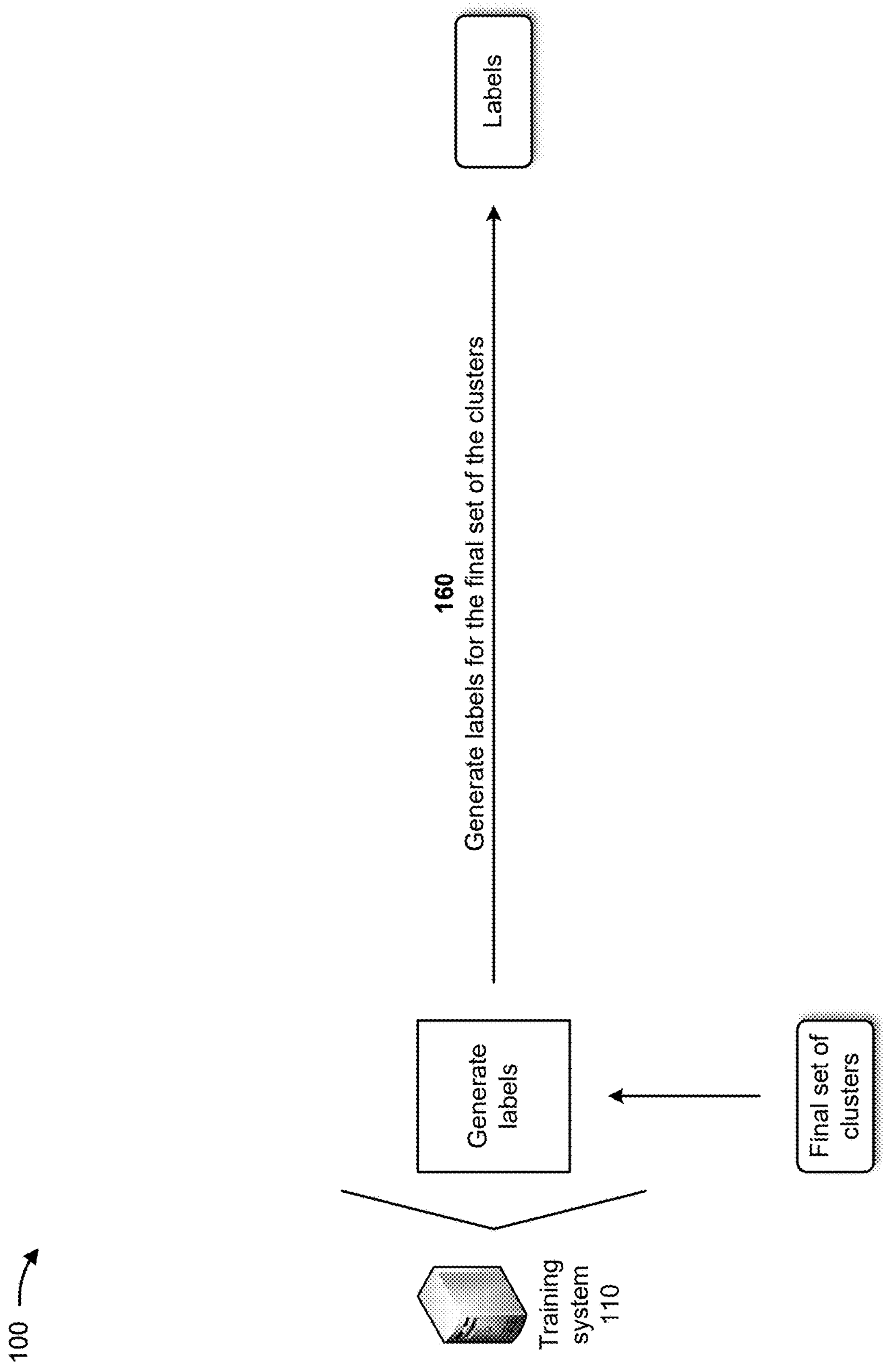

As shown in FIG. 1I, and by reference number 160, the training system 110 may generate labels for the final set of the clusters. For example, the training system 110 may analyze the final set of clusters and may assign appropriate labels that categorize the clusters based on characteristics and relevance to the machine learning model. The labels may include classifications, such as low/no missing data, moderate missing data, recent missing data, unusable data, and/or other relevant classifications. In some implementations, generating the labels for the final set of the clusters may include the training system 110 analyzing the final set of clusters to generate labels reflecting presence and types of data gaps. The labels may categorize clusters according to various criteria, such as a percentage of missing data, where various thresholds may define categories such as "less than 10% missing data," "10-30% missing data," and "more than 30% missing data."

Additionally, or alternatively, generating labels for the final set of the clusters may include the training system 110 tagging the final set of clusters based on suitability for different machine learning models. For example, clusters might be labeled as "suitable for gradient boosting," "suitable for neural networks," or "suitable for linear models," based on the characteristics derived from the data gaps. Additionally, or alternatively, generating labels for the final set of the clusters may include the training system 110 using metadata associated with each cluster to assign labels that indicate historical stability of data within the clusters. These labels could include "stable data," "moderately stable data," and "unstable data."

Additionally, or alternatively, generating labels for the final set of the clusters may include the training system 110 indicating expected reliability of datasets based on the data gap analysis. Categories may include "highly reliable," "moderately reliable," and "unreliable." Additionally, or alternatively, generating labels for the final set of the clusters may include the training system 110 generating types of time-alignment and normalization techniques applicable to each cluster. For example, clusters may be labeled as "aligned with moving average," "aligned with median fill," or "aligned with forward fill."

Additionally, or alternatively, generating labels for the final set of the clusters may include the training system 110 generating machine learning performance metrics, such as "high precision," "high recall," "high F1 score," or "low performance" based on cluster data gap characteristics. Additionally, or alternatively, generating labels for the final set of the clusters may include the training system 110 generating likely preprocessing steps required for each cluster before utilization in training. These labels could include "requires imputation," "requires outlier removal," and "requires zero filling."

Figure 1J:
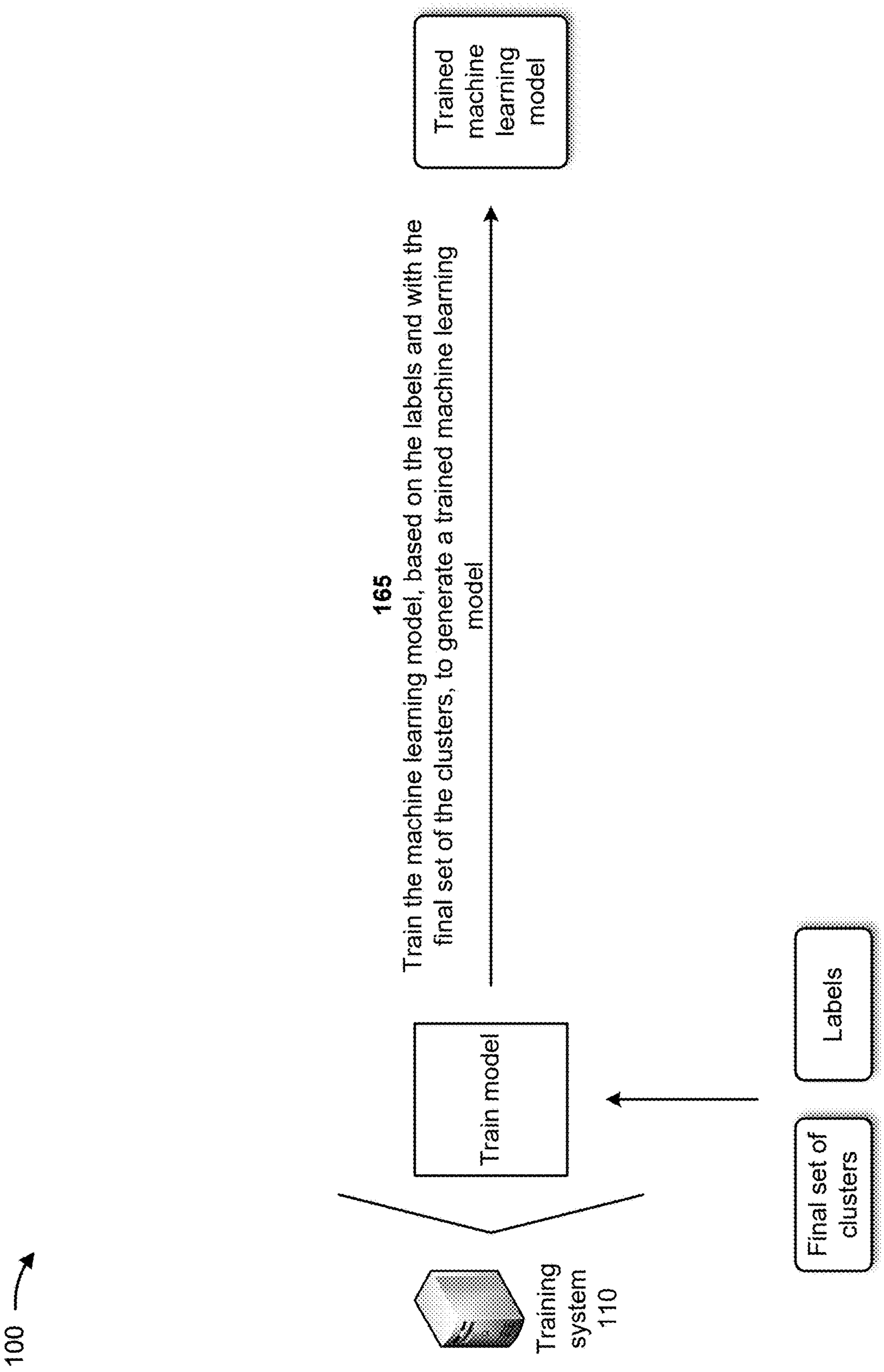

As shown in FIG. 1J, and by reference number 165, the training system 110 may train the machine learning model, based on the labels and with the final set of the clusters, to generate a trained machine learning model. For example, the training system 110 may analyze the final set of clusters and the corresponding labels that categorize the clusters based on characteristics and relevance to the machine learning model. The labels may include classifications, such as low/no missing data, moderate missing data, recent missing data, unusable data, and/or other relevant classifications, which help determine the suitability of the clusters for training the machine learning model. The training system 110 may utilize the labels and the final set of clusters to select a machine learning model, from a plurality of machine learning models, and to select appropriate training methodologies and inputs that maximize the efficacy of the training process. In some implementations, the training system 110 may evaluate performance metrics during the training process, such as precision, recall, and F1 score, to ensure that the machine learning model is effectively learning from the final set of clusters and producing accurate predictions. In some implementations, the training system 110 may utilize the final set of clusters and corresponding labels to train a selected machine learning model and produce a trained machine learning model.

Figure 1K:
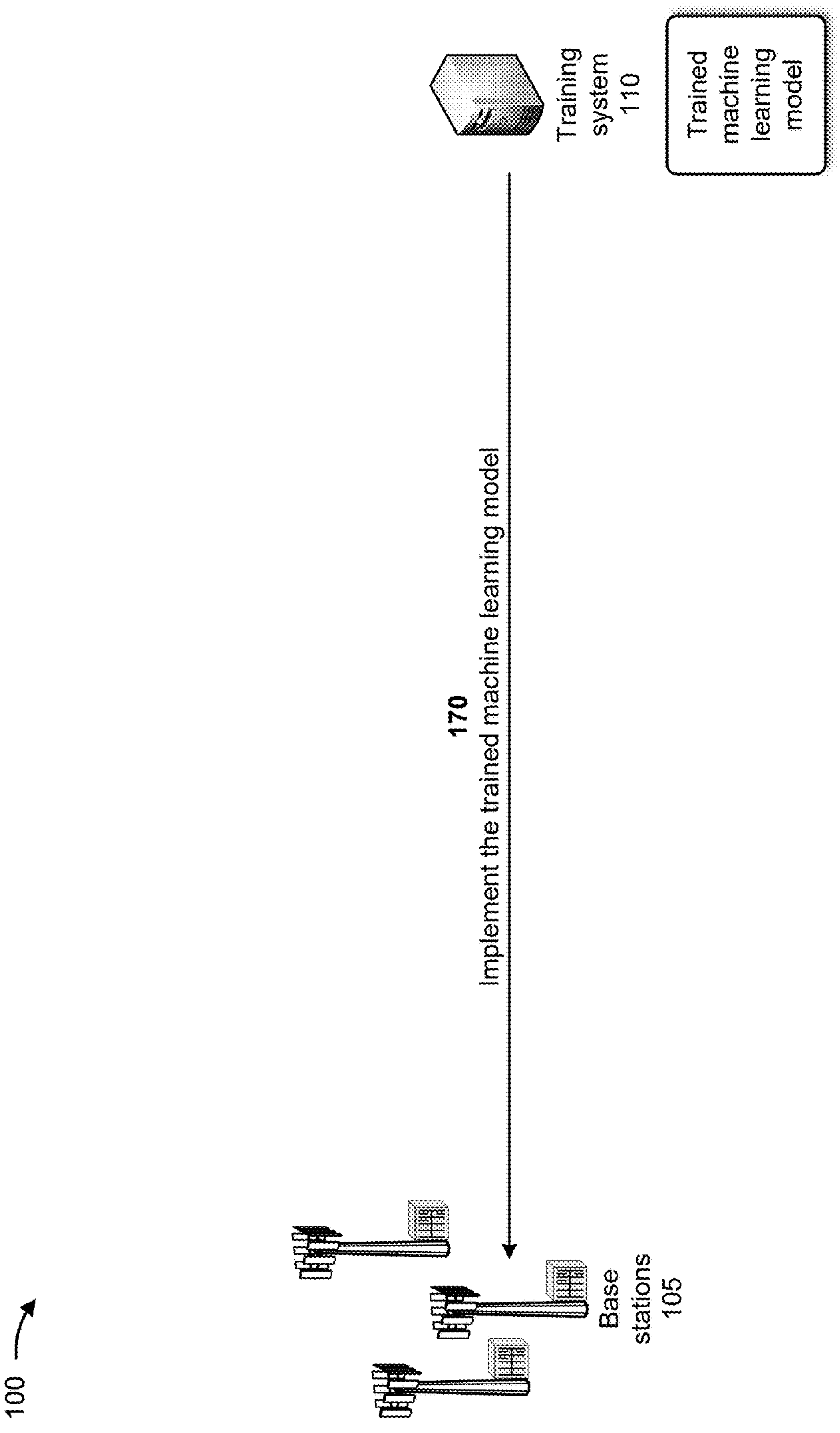

As shown in FIG. 1K, and by reference number 170, the training system 110 may implement the trained machine learning model. For example, after generating the trained machine learning model, the training system 110 may deploy the trained machine learning model to integrate within operational systems or environments. This deployment may involve routing the trained machine learning model to manage and optimize the base stations 105 by making decisions or predictions informed by the training processes. This may ensure that the trained machine learning model is put into practical use, performing tasks such as managing traffic, detecting anomalies, and adjusting network parameters based on insights gained from the training data.

In some implementations, the training system 110 may implement the trained machine learning model to perform various predictive analytics. For example, the training system 110 may apply the trained machine learning model to predict patterns related to data traffic and user behavior associated with the base stations 105. Additionally, or alternatively, the training system 110 may deploy the trained machine learning model for real-time data processing. For example, the training system 110 may utilize the trained machine learning model to monitor and analyze live data streams, providing instantaneous adjustments and responses. Additionally, or alternatively, the training system 110 may integrate the trained machine learning model into a feedback loop. For example, the training system 110 may deploy the trained machine learning model to continuously refine predictions and improve network performance based on real-time feedback.

Additionally, or alternatively, the training system 110 may utilize the trained machine learning model for system optimization. For example, the training system 110 may utilize the trained machine learning model to enhance various operational implementations, such as load balancing or resource allocation across the network. Additionally, or alternatively, the training system 110 may employ the trained machine learning model for anomaly detection. For example, the training system 110 may embed the trained machine learning model within network systems to automatically identify and respond to unusual patterns or behaviors. Additionally, or alternatively, the training system 110 may implement the trained machine learning model to assist in strategic planning. For example, the training system 110 may utilize the trained machine learning model to forecast network growth and assist in capacity planning and infrastructure development.

Additionally, or alternatively, the training system 110 may use the trained machine learning model to enhance security measures. For example, the training system 110 may utilize the trained machine learning model to monitor network activities for potential security threats and initiate protective actions. Additionally, or alternatively, the training system 110 may utilize the trained machine learning model for automating maintenance tasks. For example, the training system 110 may utilize the trained machine learning model to predict maintenance needs and schedule preventive actions based on the insights gained from historical data.

Figure 1L:
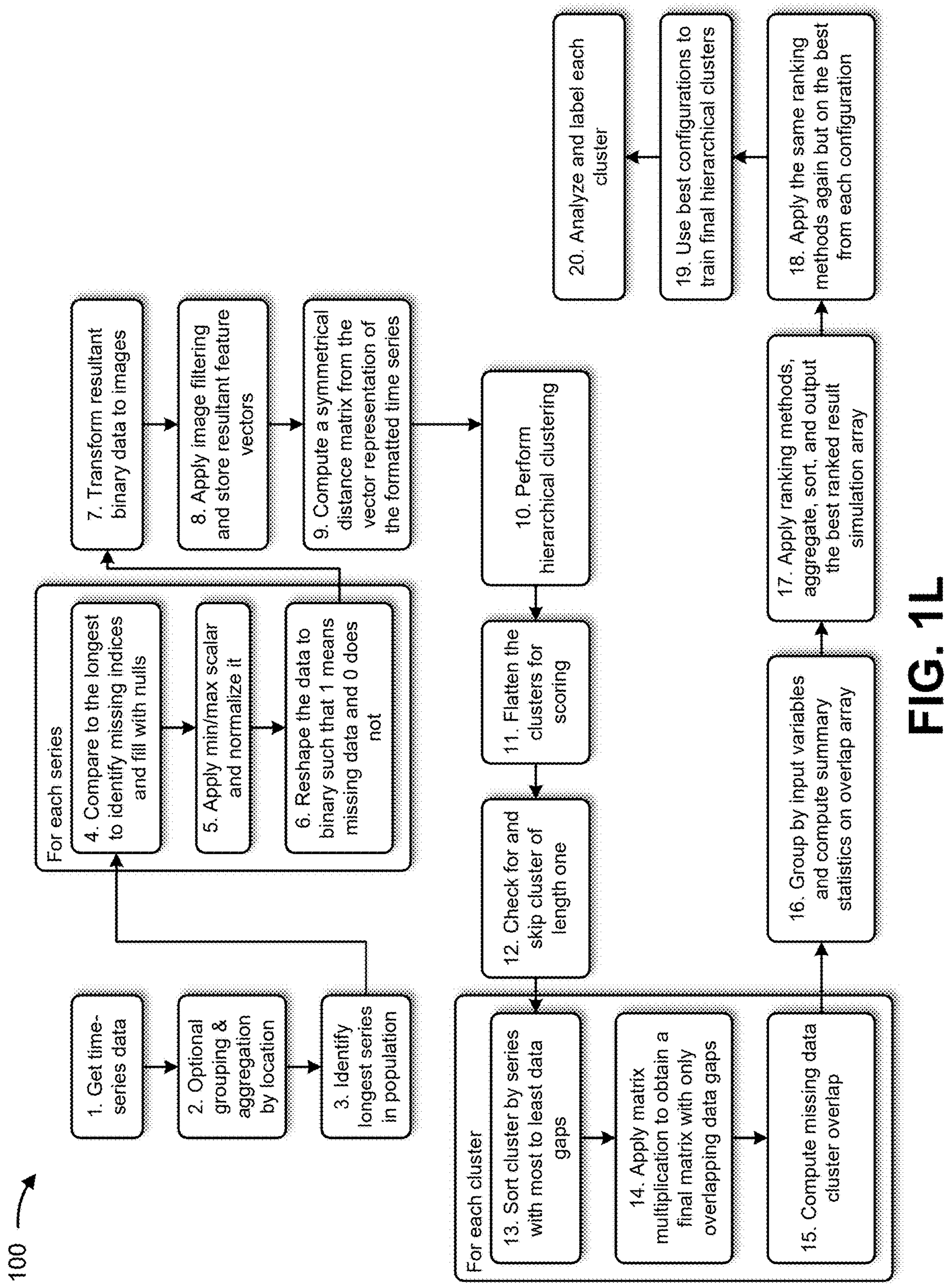

FIG. 1L is an example flow chart associated with the training system 110 correcting time-series data to be utilized as training data for a machine learning model. As shown at step 1 of FIG. 1L, the training system 110 may receive time-series data. For example, the training system 110 may receive the time-series data from various base stations 105 or sensors. Additionally, or alternatively, the training system 110 may collect chronological data from diverse sources, such as environmental sensors or operational logs.

As shown at step 2, the training system 110 may perform optional grouping and aggregation of the time-series data by location. For example, the training system 110 may optionally classify and consolidate the time-series data based on temporal segments. Categorizing the time-series data into hourly, daily, or monthly groups can improve data structure and facilitate analysis over different time spans. Additionally, or alternatively, the training system 110 may optionally arrange and compile the time-series data by data sources or types. For example, the training system 110 may sort data originating from different types of sensors (e.g., temperature vs. humidity sensors) for targeted processing.

As shown at step 3, the training system 110 may identify a longest series in the grouped and aggregated time-series data. For example, the training system 110 may determine a most extensive dataset within the aggregated time-series data. The training system 110 may scan the datasets to find the time-series data with the most extended duration to set a benchmark for comparison. Additionally, or alternatively, the training system 110 may locate the dataset of greatest duration among paired and consolidated time-series data. For example, the training system 110 may assess all consolidated entries and pinpoint the one spanning the longest continuous period.

As shown at step 4, for each of the series, the training system 110 may compare each series to the longest series to identify missing indices and fill the missing indices with nulls. For example, the training system 110 may examine variations with the longest series to spot gaps and may insert placeholders. Any gaps in the shorter series may be filled with placeholder values to align with the longest series. Additionally, or alternatively, the training system 110 may cross-reference each series with the extensive dataset to pinpoint and fill absent data points using null values. For example, the training system 110 may employ a cross-referencing technique to ensure accurate alignment with the longest dataset.

As shown at step 5, the training system 110 may apply a minimum/maximum scalar to each series and may normalize each series. For example, the training system 110 may execute data scaling processes to align the value ranges of each series. This may ensure that the data series are on a comparable scale, smoothing out any discrepancies in data magnitude. Additionally, or alternatively, the training system 110 may adjust the data levels across series through normalization techniques. For example, the training system 110 may use min-max normalization to bring all values within a defined range (e.g., from 0 to 1).

As shown at step 6, the training system 110 may reshape data in each series to binary such that a 1 (one) may indicate missing data and a 0 (zero) may indicate not missing data. For example, the training system 110 may convert each dataset to a binary code, which allows for straightforward identification of missing data points. Additionally, or alternatively, the training system 110 may map missing data to binary ones and existing data points to binary zeros within each series.

As shown at step 7, the training system 110 may transform the resultant binary data into images. For example, the training system 110 may plot the binary data into visual graphs for better analysis. This may involve plotting the binary data on a graph and converting the binary data into an image format for better visualization and further processing. Additionally, or alternatively, the training system 110 may transform the binary data into pictorial formats, aiding computational processes.

As shown at step 8, the training system 110 may apply image filtering to the images and may store resultant feature vectors. For example, the training system 110 may utilize image processing techniques, such as smoothing or noise reduction, to generate the feature vectors from the images. Additionally, or alternatively, the training system 110 may implement visual analysis filters to extract and store feature vectors from the images. For example, the training system 110 may utilize Gaussian blurring or histogram equalization to enhance data features before extraction.

As shown at step 9, the training system 110 may compute a symmetrical distance matrix from the vector representation (e.g., the resultant feature vectors) of the formatted time-series data. For example, the training system 110 may calculate the symmetrical distance matrix based on the vectorized features of the time-series data. This may include calculating distances between features to understand similarities and differences. Additionally, or alternatively, the training system 110 may generate a symmetrical distance matrix that measures feature similarity among vectorized datasets. For example, the training system 110 may utilize distance metrics, such as Euclidean or cosine similarity, to compute this matrix.

As shown at step 10, the training system 110 may perform hierarchical clustering on the symmetrical distance matrix. For example, the training system 110 may apply hierarchical clustering models to the symmetrical distance matrix to group data. This may include grouping the time-series data into clusters based on their distances to create meaningful groupings. Additionally, or alternatively, the training system 110 may execute top-down or bottom-up clustering techniques on the symmetrical distance matrix to form clusters. For example, an agglomerative approach may be employed to iteratively merge closest pairs until desired clusters form.

As shown at step 11, the training system 110 may flatten the clusters for scoring. For example, the training system 110 may convert hierarchical cluster data into a flat structure to facilitate scoring. Additionally, or alternatively, the training system 110 may simplify the clusters into linear lists for assessment purposes. Representing hierarchical clusters as flat structures can streamline the scoring process and facilitate performance evaluation.

As shown at step 12, the training system 110 may check for and skip any cluster of length one. For example, the training system 110 may identify and bypass singleton clusters for being non-informative. Thus, clusters containing only a single data point may be filtered out for being uninformative. Additionally, or alternatively, the training system 110 may detect clusters with only one member and may exclude such clusters from further analysis.

As shown at step 13, the training system 110 may sort the clusters by series with most to least data gaps. For example, the training system 110 may rank the clusters according to the amount of missing data from highest to lowest. Additionally, or alternatively, the training system 110 may order the clusters based on the density of absent data points. Understanding which clusters have the most significant data gaps can guide priority decisions in further processing.

As shown at step 14, the training system 110 may apply matrix multiplication to obtain a final matrix with only overlapping data gaps. For example, the training system 110 may utilize matrix operations to derive a final layer depicting shared data gaps. This may produce a matrix highlighting common missing data points across all series within a cluster. Additionally, or alternatively, the training system 110 may perform matrix calculations to isolate common missing segments. For example, operations like Hadamard product may be employed to spotlight overlapping gaps efficiently.

As shown at step 15, the training system 110 may compute a missing data cluster overlap percentage and may store a cluster summary in an overlap array. For example, the training system 110 may calculate an extent of data gap intersection among clusters and may store the findings. Additionally, or alternatively, the training system 110 may determine overlap metrics for missing data within clusters. For example, the overlap metrics for missing data within clusters may be stored in an array for quick reference and further statistical calculations.

As shown at step 16, the training system 110 may group by input variables and may compute summary statistics on the overlap array. For example, the training system 110 may classify the clusters based on input criteria and may compile relevant statistics. The training system 110 may categorize the clusters based on input parameters and may calculate summary statistics to assess data integrity. Additionally, or alternatively, the training system 110 may organize clusters by predefined variables and aggregate summary metrics on the overlaps. For example, clusters may be grouped based on sensor types or data source, followed by computing relevant statistics, such as mean and variance.

As shown at step 17, the training system 110 may apply ranking methods, may aggregate, may sort, and may output the best ranked result simulation array. For example, the training system 110 may employ various scoring models to rank and may select optimal cluster configurations. The training system 110 may utilize various scoring methods to rank clusters and identify the best configurations. Additionally, or alternatively, the training system 110 may integrate, order, and produce the top-ranking cluster results based on performance metrics, such as a silhouette score or cohesion.

As shown at step 18, the training system 110 may apply the same ranking methods again but on the best from each configuration to output a best fit for the time-series data. For example, the training system 110 may apply ranking criteria on top-performing clusters to determine the best fit. This may ensure that an optimal configuration is selected based on ranking criteria. Additionally, or alternatively, the training system 110 may utilize ranking techniques on selected cluster configurations to finalize the optimal match.

As shown at step 19, the training system 110 may utilize best configurations to train final hierarchical clusters. For example, the training system 110 may utilize the optimal clusters for training final hierarchical models. Additionally, or alternatively, the training system 110 may employ the best cluster configurations to construct and refine hierarchical training sets. For example, the final configurations may be used to form the comprehensive training sets that reflect both the structure and nuances of the time-series data.

As shown at step 20, the training system 110 may analyze each cluster for the overall data profile and may label appropriately using business logic for routing to machine learning model uses (e.g., label as low/no missing data, moderate missing data, missing recent data, unusable data, and/or the like). For example, the training system 110 may evaluate clusters to generate a comprehensive data profile and assign labels per business criteria. Clusters may be labeled as having low/no missing data, moderate missing data, recent missing data, and/or the like, to guide their application. Additionally, or alternatively, the training system 110 may inspect clusters and categorize the clusters using business rules for targeted machine learning applications.

In this way, the training system 110 corrects time-series data to be utilized as training data for a machine learning model. For example, the training system 110 may receive time-series data and categorize it into distinct segments based on sources or locations of the data. The training system 110 may detect discontinuities within each segment of time-series data, may sanitize the discontinuities to generate representations of normalized data gaps, and may execute feature extraction on those representations to identify distinguishing features. Subsequently, the training system 110 may calculate spatial relationships derived from the identified features, may convert those relationships into vector-based representations, and may apply hierarchical and agglomerative clustering to the vector-based spatial relationships to form distinct clusters. The training system 110 may select a subset of these clusters, may employ a data augmentation method to synthesize data for missing elements, and may utilize the enhanced dataset to train a machine learning model. Thus, the training system 110 may conserve computing resources, networking resources, and/or other resources that would have otherwise been consumed by failing to address data incompleteness in time-series data, generating an improperly trained machine learning model based on incomplete time-series data, generating erroneous predictions with the improperly trained machine learning model, handling customer complaints associated with the erroneous predictions of the machine learning model, retraining the improperly trained machine learning models, and/or the like.

As indicated above, FIGS. 1A-1L are provided as an example. Other examples may differ from what is described with regard to FIGS. 1A-1L. The number and arrangement of devices shown in FIGS. 1A-1L are provided as an example. In practice, there may be additional devices, fewer devices, different devices, or differently arranged devices than those shown in FIGS. 1A-1L. Furthermore, two or more devices shown in FIGS. 1A-1L may be implemented within a single device, or a single device shown in FIGS. 1A-1L may be implemented as multiple, distributed devices. Additionally, or alternatively, a set of devices (e.g., one or more devices) shown in FIGS. 1A-1L may perform one or more functions described as being performed by another set of devices shown in FIGS. 1A-1L.

Figure 2:
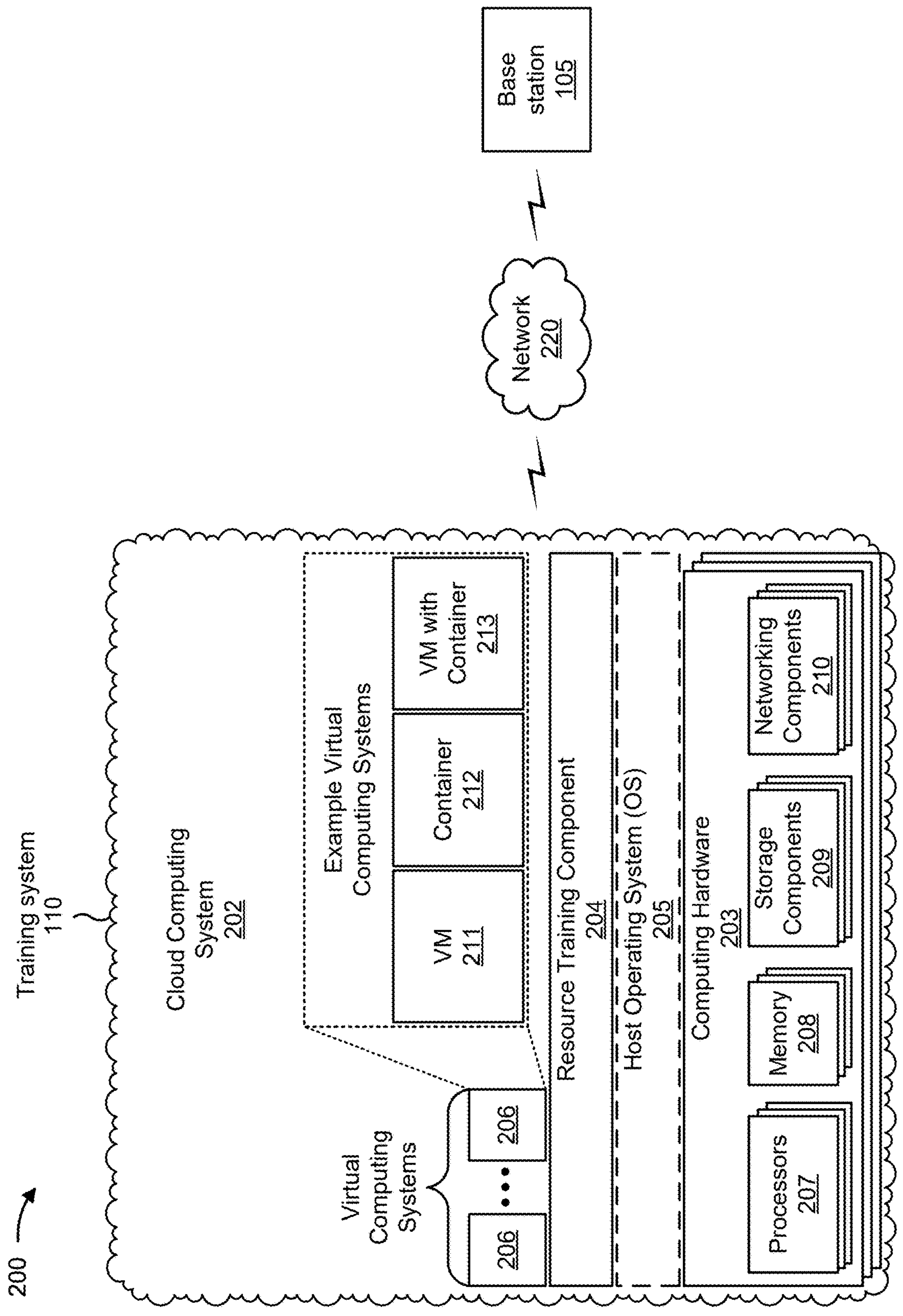
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include the training system 110, which may include one or more elements of and/or may execute within a cloud computing system 202. The cloud computing system 202 may include one or more elements 203-213, as described in more detail below. As further shown in FIG. 2, the environment 200 may include the base station 105 and/or a network 220. Devices and/or elements of the environment 200 may interconnect via wired connections and/or wireless connections.

The base station 105 includes one or more devices capable of transferring traffic, such as audio, video, text, and/or other traffic, destined for and/or received from a user equipment (UE). For example, the base station 105 may include an eNodeB (eNB) associated with a long term evolution (LTE) network that receives traffic from and/or sends traffic to a core network, a gNodeB (gNB) associated with a radio access network (RAN) of a fifth-generation (5G) network, a base transceiver station, a radio base station, a base station subsystem, a cellular site, a cellular tower, an access point, a transmit receive point (TRP), a radio access node, a macrocell base station, a microcell base station, a picocell base station, a femtocell base station, and/or another network entity capable of supporting wireless communication. The base station 105 may support, for example, a cellular radio access technology (RAT). The base station 105 may transfer traffic between a UE (e.g., using a cellular RAT), one or more other base stations 105 (e.g., using a wireless interface or a backhaul interface, such as a wired backhaul interface), and/or a core network. The base station 105 may provide one or more cells that cover geographic areas.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of the computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 includes hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as the computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using the computing hardware 203. As shown, the virtual computing system 206 may include a virtual machine 211, a container 212, or a hybrid environment 213 that includes a virtual machine and a container, among other examples. The virtual computing system 206 may execute one or more applications using a file system that includes binary files, software libraries, and/or other resources required to execute applications on a guest operating system (e.g., within the virtual computing system 206) or the host operating system 205.

Although the training system 110 may include one or more elements 203-213 of the cloud computing system 202, may execute within the cloud computing system 202, and/or may be hosted within the cloud computing system 202, in some implementations, the training system 110 may not be cloud-based (e.g., may be implemented outside of a cloud computing system) or may be partially cloud-based. For example, the training system 110 may include one or more devices that are not part of the cloud computing system 202, such as the device 300 of FIG. 3, which may include a standalone server or another type of computing device. The training system 110 may perform one or more operations and/or processes described in more detail elsewhere herein.

The network 220 includes one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
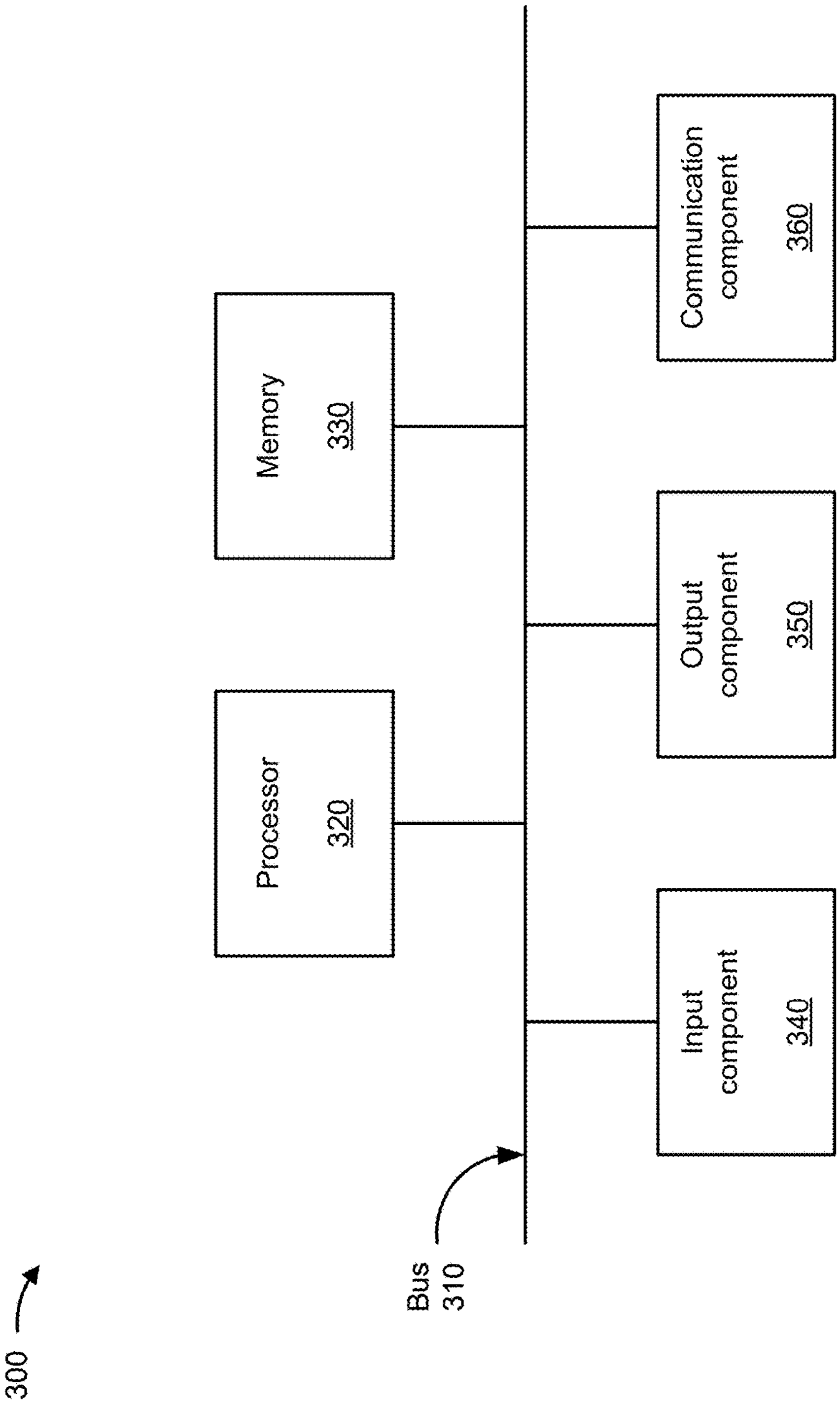
FIG. 3 is a diagram of example components of one or more devices of FIG. 2.

FIG. 3 is a diagram of example components of a device 300, which may correspond to the base station 105 and/or the training system 110. In some implementations, the base station 105 and/or the training system 110 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
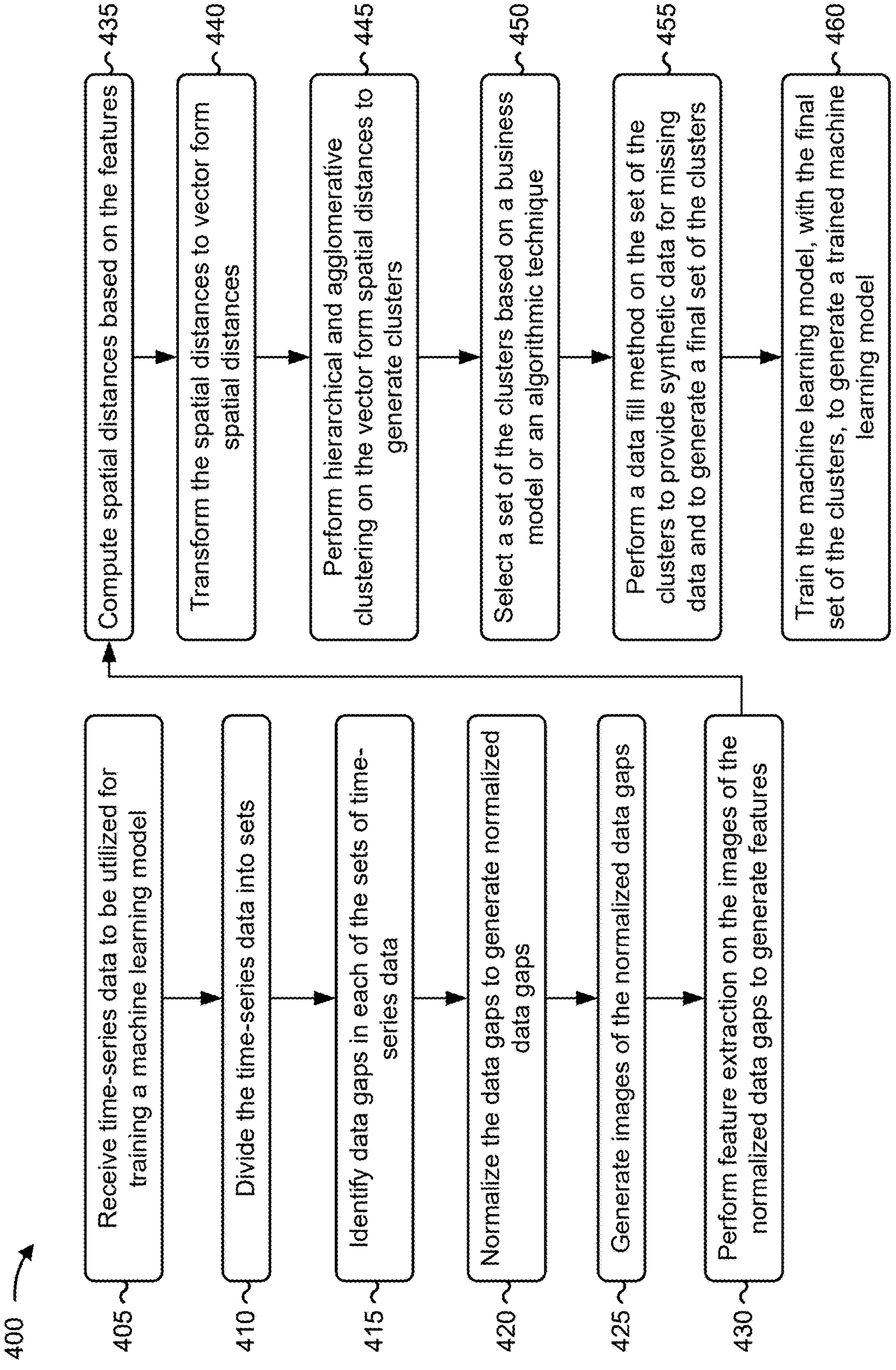
FIG. 4 is a flowchart of an example process for correcting time-series data to be utilized as training data for a machine learning model.

FIG. 4 is a flowchart of an example process 400 for correcting time-series data to be utilized as training data for a machine learning model. In some implementations, one or more process blocks of FIG. 4 may be performed by a device (e.g., the training system 110). In some implementations, one or more process blocks of FIG. 4 may be performed by another device or a group of devices separate from or including the device, such as a base station (e.g., the base station 105). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving time-series data to be utilized for training a machine learning model (block 405). For example, the device may receive time-series data to be utilized for training a machine learning model, as described above. In some implementations, the time-series data includes data generated by a plurality of base stations provided at a plurality of locations.

As further shown in FIG. 4, process 400 may include dividing the time-series data into sets (block 410). For example, the device may divide the time-series data into sets based on sources of the time-series data or locations associated with the time-series data, as described above.

As further shown in FIG. 4, process 400 may include identifying data gaps in each of the sets of time-series data (block 415). For example, the device may identify data gaps in each of the sets of time-series data, as described above.

As further shown in FIG. 4, process 400 may include normalizing the data gaps to generate normalized data gaps (block 420). For example, the device may normalize the data gaps to generate normalized data gaps, as described above. In some implementations, normalizing the data gaps to generate the normalized data gaps includes time aligning data gaps, and applying a minimum/maximum scalar to the data gaps to generate the normalized data gaps.

As further shown in FIG. 4, process 400 may include generating images of the normalized data gaps (block 425). For example, the device may generate images of the normalized data gaps, as described above. In some implementations, generating the images of the normalized data gaps includes transforming the normalized data gaps into a binary form in which a 1 (one) represents missing data and a 0 (zero) represents available data.

As further shown in FIG. 4, process 400 may include performing feature extraction on the images of the normalized data gaps to generate features (block 430). For example, the device may perform feature extraction on the images of the normalized data gaps to generate features, as described above. In some implementations, performing the feature extraction on the images of the normalized data gaps to generate the features includes applying image filtering techniques to the images of the normalized data gaps to generate the features.

As further shown in FIG. 4, process 400 may include computing spatial distances based on the features (block 435). For example, the device may compute spatial distances based on the features, as described above.

As further shown in FIG. 4, process 400 may include transforming the spatial distances to vector form spatial distances (block 440). For example, the device may transform the spatial distances to vector form spatial distances, as described above. In some implementations, transforming the spatial distances to the vector form spatial distances includes utilizing an object detection technique to transform the spatial distances to the vector form spatial distances.

As further shown in FIG. 4, process 400 may include performing hierarchical and agglomerative clustering on the vector form spatial distances to generate clusters (block 445). For example, the device may perform hierarchical and agglomerative clustering on the vector form spatial distances to generate clusters, as described above. In some implementations, performing the hierarchical and agglomerative clustering on the vector form spatial distances to generate the clusters includes utilizing symmetrical distance matrices on the vector form spatial distances to generate the clusters. In some implementations, performing the hierarchical and agglomerative clustering on the vector form spatial distances to generate the clusters includes iteratively adjusting hyperparameters associated with the hierarchical and agglomerative clustering based on validation performance of the trained machine learning.

As further shown in FIG. 4, process 400 may include selecting a set of the clusters based on a business model or an algorithmic technique (block 450). For example, the device may select a set of the clusters based on a business model or an algorithmic technique, as described above.

As further shown in FIG. 4, process 400 may include performing a data fill method on the set of the clusters to provide synthetic data for missing data and to generate a final set of the clusters (block 455). For example, the device may perform a data fill method on the set of the clusters to provide synthetic data for missing data and to generate a final set of the clusters, as described above.

As further shown in FIG. 4, process 400 may include training the machine learning model, with the final set of the clusters, to generate a trained machine learning model (block 460). For example, the device may train the machine learning model, with the final set of the clusters, to generate a trained machine learning model, as described above.

In some implementations, process 400 includes implementing the trained machine learning model to one or more of manage and optimize base stations of a network, predict patterns related to network data traffic and user behavior associated with the base stations, monitor and analyze live data streams of the network, improve network performance based on real-time feedback, allocate resources across the network, identify and respond to unusual patterns or behaviors of the network, forecast network growth and assist in capacity planning and infrastructure development, or enhance security in the network.

In some implementations, process 400 includes generating labels for the final set of the clusters, and training the machine learning model includes training the machine learning model, based on the labels and with the final set of the clusters, to generate the trained machine learning model. In some implementations, process 400 includes isolating the data gaps from the time-series data prior to normalizing the data gaps. In some implementations, process 400 includes selecting the machine learning model, from a plurality of machine learning models, based on the final set of the clusters and prior to training the machine learning model. In some implementations, process 400 includes aggregating the time-series data prior to dividing the time-series data into the sets and based on the sources of the time-series data or the locations associated with the time-series data.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

receiving, by a device, time-series data to be utilized for training a machine learning model;

dividing, by the device, the time-series data into sets based on sources of the time-series data or locations associated with the time-series data;

identifying, by the device, data gaps in each of the sets of time-series data;

normalizing, by the device, the data gaps to generate normalized data gaps;

generating, by the device, images of the normalized data gaps;

performing, by the device, feature extraction on the images of the normalized data gaps to generate features;

computing, by the device, spatial distances based on the features;

transforming, by the device, the spatial distances to vector form spatial distances;

performing, by the device, hierarchical and agglomerative clustering on the vector form spatial distances to generate clusters;

selecting, by the device, a set of the clusters based on a business model or an algorithmic technique;

performing, by the device, a data fill method on the set of the clusters to provide synthetic data for missing data and to generate a final set of the clusters; and training, by the device, the machine learning model, with the final set of the clusters, to generate a trained machine learning model.

2. The method of claim 1, further comprising:

implementing the trained machine learning model to one or more of:

manage and optimize base stations of a network, predict patterns related to network data traffic and user behavior associated with the base stations, monitor and analyze live data streams of the network, improve network performance based on real-time feedback, allocate resources across the network, identify and respond to unusual patterns or behaviors of the network, forecast network growth and assist in capacity planning and infrastructure development, or enhance security in the network.

3. The method of claim 1, further comprising:

generating labels for the final set of the clusters, wherein training the machine learning model comprises:

training the machine learning model, based on the labels and with the final set of the clusters, to generate the trained machine learning model.

4. The method of claim 1, wherein the time-series data includes data generated by a plurality of base stations provided at a plurality of locations.

5. The method of claim 1, further comprising:

isolating the data gaps from the time-series data prior to normalizing the data gaps.

6. The method of claim 1, wherein normalizing the data gaps to generate the normalized data gaps comprises:

time aligning data gaps; and applying a minimum/maximum scalar to the data gaps to generate the normalized data gaps.

7. The method of claim 1, wherein generating the images of the normalized data gaps comprises:

transforming the normalized data gaps into a binary form in which a 1 (one) represents missing data and a 0 (zero) represents available data.

8. A device, comprising:

one or more processors configured to:

receive time-series data to be utilized for training a machine learning model;

divide the time-series data into sets based on sources of the time-series data or locations associated with the time-series data;

identify data gaps in each of the sets of time-series data;

isolate the data gaps from the time-series data;

normalize the data gaps to generate normalized data gaps;

generate images of the normalized data gaps;

perform feature extraction on the images of the normalized data gaps to generate features;

compute spatial distances based on the features;

transform the spatial distances to vector form spatial distances;

perform hierarchical and agglomerative clustering on the vector form spatial distances to generate clusters;

select a set of the clusters based on a business model or an algorithmic technique;

perform a data fill method on the set of the clusters to provide synthetic data for missing data and to generate a final set of the clusters; and train the machine learning model, with the final set of the clusters, to generate a trained machine learning model.

9. The device of claim 8, wherein the one or more processors, to perform the feature extraction on the images of the normalized data gaps to generate the features, are configured to:

apply image filtering techniques to the images of the normalized data gaps to generate the features.

10. The device of claim 8, wherein the one or more processors, to perform the hierarchical and agglomerative clustering on the vector form spatial distances to generate the clusters, are configured to:

utilize symmetrical distance matrices on the vector form spatial distances to generate the clusters.

11. The device of claim 8, wherein the one or more processors, to transform the spatial distances to the vector form spatial distances, are configured to:

utilize an object detection technique to transform the spatial distances to the vector form spatial distances.

12. The device of claim 8, wherein the one or more processors are further configured to:

select the machine learning model, from a plurality of machine learning models, based on the final set of the clusters and prior to training the machine learning model.

13. The device of claim 8, wherein the one or more processors, to perform the hierarchical and agglomerative clustering on the vector form spatial distances to generate the clusters, are configured to:

iteratively adjust hyperparameters associated with the hierarchical and agglomerative clustering based on validation performance of the trained machine learning.

14. The device of claim 8, wherein the one or more processors are further configured to:

aggregate the time-series data prior to dividing the time-series data into the sets and based on the sources of the time-series data or the locations associated with the time-series data.

15. A non-transitory computer-readable medium storing a set of instructions, the set of instructions comprising:

one or more instructions that, when executed by one or more processors of a device, cause the device to:

receive time-series data to be utilized for training a machine learning model;

divide the time-series data into sets based on sources of the time-series data or locations associated with the time-series data;

identify data gaps in each of the sets of time-series data;

normalize the data gaps to generate normalized data gaps;

generate images of the normalized data gaps;

perform feature extraction on the images of the normalized data gaps to generate features;

compute spatial distances based on the features;

transform the spatial distances to vector form spatial distances;

perform hierarchical and agglomerative clustering on the vector form spatial distances to generate clusters;

select a set of the clusters based on a business model or an algorithmic technique;

perform a data fill method on the set of the clusters to provide synthetic data for missing data and to generate a final set of the clusters;

train the machine learning model, with the final set of the clusters, to generate a trained machine learning model; and implement the trained machine learning model.

16. The non-transitory computer-readable medium of claim 15, wherein the one or more instructions further cause the device to:

generate labels for the final set of the clusters, wherein the one or more instructions, that cause the device to train the machine learning model, cause the device to:

train the machine learning model, based on the labels and with the final set of the clusters, to generate the trained machine learning model.

17. The non-transitory computer-readable medium of claim 15, wherein the one or more instructions further cause the device to:

isolate the data gaps from the time-series data prior to normalizing the data gaps.

18. The non-transitory computer-readable medium of claim 15, wherein the one or more instructions, that cause the device to normalize the data gaps to generate the normalized data gaps, cause the device to:

time align data gaps; and apply a minimum/maximum scalar to the data gaps to generate the normalized data gaps.

19. The non-transitory computer-readable medium of claim 15, wherein the one or more instructions, that cause the device to generate the images of the normalized data gaps, cause the device to:

transform the normalized data gaps into a binary form in which a 1 (one) represents missing data and a 0 (zero) represents available data.

20. The non-transitory computer-readable medium of claim 15, wherein the one or more instructions, that cause the device to perform the feature extraction on the images of the normalized data gaps to generate the features, cause the device to:

apply image filtering techniques to the images of the normalized data gaps to generate the features.

* * * * *